United States Patent
Smith et al.

(10) Patent No.: US 10,921,422 B2
(45) Date of Patent: Feb. 16, 2021

(54) BELOW-NOISE AFTER TRANSMIT (BAT) CHIRP RADAR

(71) Applicants: The Boeing Company, Chicago, IL (US); HRL Laboratories, LLC, Malibu, CA (US)

(72) Inventors: Jason R. Smith, Seattle, WA (US); Shankar Rao, Agoura Hills, CA (US); Peter Petre, Oak Park, CA (US); Peter S. Wittenberg, Creve Coeur, MO (US); Simon L. Haxton, Long Beach, CA (US)

(73) Assignees: The Boeing Company, Chicago, IL (US); HRL Laboratories, LLC, Malibu, CA (US)

( * ) Notice: Subject to any disclaimer, the term of this patent is extended or adjusted under 35 U.S.C. 154(b) by 426 days.

(21) Appl. No.: 15/885,344

(22) Filed: Jan. 31, 2018

(65) Prior Publication Data

US 2019/0120932 A1 Apr. 25, 2019

Related U.S. Application Data

(60) Provisional application No. 62/577,076, filed on Oct. 25, 2017.

(51) Int. Cl.
*G01S 13/26* (2006.01)
*G01S 7/28* (2006.01)
(Continued)

(52) U.S. Cl.
CPC ............ *G01S 7/2813* (2013.01); *G01S 7/023* (2013.01); *G01S 7/03* (2013.01); *G01S 7/2921* (2013.01);
(Continued)

(58) Field of Classification Search
CPC . G01S 7/03; G01S 7/023; G01S 7/354; G01S 7/414; G01S 7/417; G01S 7/418;
(Continued)

(56) References Cited

U.S. PATENT DOCUMENTS 5,325,095 A * 6/1994 Vadnais .............. G01S 13/0209
 342/129
5,402,520 A * 3/1995 Schnitta .................. G01S 7/292
 704/226

(Continued)

FOREIGN PATENT DOCUMENTS

| CN | 102281221 A | 12/2011 |
| CN | 105704075 A | 6/2016 |
| WO | 2018136144 A1 | 7/2018 |

OTHER PUBLICATIONS

Wikipedia; "Recurrent neural network," downloaded from: https://en.wikipedia.org/wiki/Recurrent_neural_network on Sep. 26, 2016, 6 pages.

(Continued)

*Primary Examiner* — Timothy A Brainard
*Assistant Examiner* — Nuzhat Pervin
(74) *Attorney, Agent, or Firm* — Sage Patent Group

(57) ABSTRACT

A radar system including a transmit antenna for transmitting a radio frequency (RF) signal or a radar signal and a receive antenna for receiving a plurality of reflected signals created by a plurality of targets reflecting the RF signal or radar signal. The reflected signals include noise. The radar system also includes an analog-to-digital converter (ADC) that digitizes or samples the reflected signals to provide a digitized or sampled noisy input signal. The radar system further includes a reservoir computer that receives the noisy input signal. The reservoir computer includes a time-varying reservoir and is configured to de-noise the noisy input signal and provide a range measurement for each of the plurality of targets.

20 Claims, 10 Drawing Sheets

(51) Int. Cl.
    *G01S 7/295*     (2006.01)
    *G01S 7/52*     (2006.01)
    *G01S 7/03*     (2006.01)
    *G01S 13/82*     (2006.01)
    *G01S 13/28*     (2006.01)
    *G01S 13/90*     (2006.01)
    *G01S 13/00*     (2006.01)
    *G01S 7/02*     (2006.01)
    *G01S 13/32*     (2006.01)
    *G06K 9/62*     (2006.01)
    *G01S 7/41*     (2006.01)
    *G01S 13/34*     (2006.01)
    *G01S 7/292*     (2006.01)
    *G01S 7/35*     (2006.01)
    *G06K 9/00*     (2006.01)
    *G06N 3/04*     (2006.01)
    *G01S 13/02*     (2006.01)
    *G06N 3/08*     (2006.01)
    *G01S 13/87*     (2006.01)
    *G01S 13/931*     (2020.01)
    *G01S 13/933*     (2020.01)

(52) U.S. Cl.
    CPC .......... *G01S 7/2923* (2013.01); *G01S 7/2955* (2013.01); *G01S 7/354* (2013.01); *G01S 7/414* (2013.01); *G01S 7/417* (2013.01); *G01S 7/418* (2013.01); *G01S 7/52077* (2013.01); *G01S 13/003* (2013.01); *G01S 13/0209* (2013.01); *G01S 13/26* (2013.01); *G01S 13/282* (2013.01); *G01S 13/32* (2013.01); *G01S 13/343* (2013.01); *G01S 13/825* (2013.01); *G01S 13/90* (2013.01); *G06K 9/0051* (2013.01); *G06K 9/0057* (2013.01); *G06K 9/624* (2013.01); *G06K 9/6274* (2013.01); *G06N 3/0445* (2013.01); *G06N 3/084* (2013.01); *G01S 13/878* (2013.01); *G01S 13/931* (2013.01); *G01S 13/933* (2020.01)

(58) Field of Classification Search
    CPC .... G01S 7/2813; G01S 7/2921; G01S 7/2923; G01S 7/2955; G01S 7/52077; G01S 13/003; G01S 13/26; G01S 13/32; G01S 13/90; G01S 13/282; G01S 13/343; G01S 13/825; G01S 13/878; G01S 13/931; G01S 13/933; G01S 13/0209; G06K 9/0051; G06K 9/0057; G06K 9/624; G06K 9/6274; G06N 3/084; G06N 3/0445
    USPC ........................................................ 342/132
    See application file for complete search history.

(56) References Cited

U.S. PATENT DOCUMENTS

| | | | | |
|---|---|---|---|---|
| 5,499,029 | A * | 3/1996 | Bashforth | G01S 13/0209 |
| | | | | 342/129 |
| 5,504,487 | A * | 4/1996 | Tucker | G01S 7/417 |
| | | | | 342/159 |
| 5,694,474 | A | 12/1997 | Ngo et al. | |
| 6,691,073 | B1 * | 2/2004 | Erten | G01S 7/52001 |
| | | | | 367/129 |
| 7,403,144 | B1 | 7/2008 | Cruz-Albrecht et al. | |
| 7,474,756 | B2 * | 1/2009 | Rickard | G06K 9/624 |
| | | | | 381/94.1 |
| 7,822,698 | B1 | 10/2010 | Cruz-Albrecht et al. | |
| 8,031,117 | B2 * | 10/2011 | Goldberg | H04B 7/10 |
| | | | | 342/378 |
| 8,548,656 | B1 * | 10/2013 | Blake | B63H 21/213 |
| | | | | 701/21 |
| 8,566,265 | B1 | 10/2013 | Cruz-Albrecht et al. | |
| 8,959,040 | B1 | 2/2015 | Cruz-Albrecht et al. | |
| 8,977,578 | B1 | 3/2015 | Cruz-Albrecht et al. | |
| 9,042,496 | B1 * | 5/2015 | Su | H04L 27/0012 |
| | | | | 375/346 |
| 9,749,007 | B1 * | 8/2017 | Martin | G01S 7/414 |
| 9,753,121 | B1 * | 9/2017 | Davis | G01S 13/70 |
| 9,791,564 | B1 * | 10/2017 | Harris | G01S 13/931 |
| 2005/0267377 | A1 | 12/2005 | Marossero et al. | |
| 2006/0208169 | A1 * | 9/2006 | Breed | G06K 9/00624 |
| | | | | 250/221 |
| 2008/0204309 | A1 * | 8/2008 | Reeves | G01S 13/87 |
| | | | | 342/195 |
| 2010/0106356 | A1 * | 4/2010 | Trepagnier | G08G 1/16 |
| | | | | 701/25 |
| 2011/0128178 | A1 * | 6/2011 | Dafesh | H04K 3/228 |
| | | | | 342/17 |
| 2012/0232418 | A1 | 9/2012 | Kimura et al. | |
| 2012/0250748 | A1 * | 10/2012 | Nguyen | G01S 13/90 |
| | | | | 375/224 |
| 2012/0313813 | A1 * | 12/2012 | Brooks | G01S 7/288 |
| | | | | 342/159 |
| 2014/0079248 | A1 * | 3/2014 | Short | G10L 13/02 |
| | | | | 381/119 |
| 2014/0180914 | A1 * | 6/2014 | Abhyanker | G05D 1/102 |
| | | | | 705/39 |
| 2015/0202770 | A1 * | 7/2015 | Patron | G06Q 20/386 |
| | | | | 700/245 |
| 2015/0208945 | A1 * | 7/2015 | Lux | A61B 5/113 |
| | | | | 600/430 |
| 2015/0287422 | A1 * | 10/2015 | Short | G10L 13/02 |
| | | | | 704/205 |
| 2016/0054432 | A1 * | 2/2016 | Lilburn | G01S 13/28 |
| | | | | 342/195 |
| 2016/0072543 | A1 | 3/2016 | Abrishamkar et al. | |
| 2016/0171974 | A1 * | 6/2016 | Hannun | G06N 3/0454 |
| | | | | 704/232 |
| 2016/0261793 | A1 * | 9/2016 | Sivan | H04N 5/23219 |
| 2017/0153318 | A1 * | 6/2017 | Melzer | G01S 7/4056 |
| 2017/0199270 | A1 * | 7/2017 | Huemer | G01S 7/4021 |
| 2017/0212205 | A1 | 7/2017 | Bialer et al. | |
| 2018/0089558 | A1 | 3/2018 | Wittenberg et al. | |
| 2018/0164406 | A1 * | 6/2018 | Culkin | G01S 13/522 |
| 2018/0197089 | A1 * | 7/2018 | Krasser | H04L 41/145 |
| 2019/0324108 | A1 | 10/2019 | Wittenberg et al. | |

OTHER PUBLICATIONS

Wikipedia; "Rprop," downloaded from: https://en.wikipedia.org/wiki/Rprop on Sep. 26, 2016, 2 pages.

Wikipedia; "Spectral density estimation," downloaded from: https://en.wikipedia.org/wiki/Spectral_density_estimation on Sep. 26, 2016, 8 pages.

Wikipedia; "State-space representation," downloaded from: https://en.wikipedia.org/wiki/State-space_representation on Sep. 26, 2016, 11 pages.

Evangelista et al, Chapter 1: Sound Source Separation, Digital Audio Effects, $2^{nd}$ edition, Zoelzer (ed.), John Wiley and Songs, (2011), pp. 1-42.

Guldenschuh et al., Prediction Filter Design for Active Noise Cancellation Headphones, IET Signal Processing, (2013) pp. 1-8.

Cho, et al., Active Noise Cancelling using Analog NeuroChip with On-Chip Learning Capability, NIPS'98 Proceedings of the $11^{th}$ International Conference on Neural Information Processing Systems, (1998), pp. 664-670.

Chen et al., Active Cancellation System of Acoustic Noise in MR Imaging, IEEE Transactions on Biomedical Engineering, vol. 46, No. 2, (1999), pp. 186-191.

S. Choi, A. Cichocki, H.-M. Park, and S.-Y. Lee, "Blind Source Separation and Independent Component Analysis: A Review," Neural Information Processing—Letters, vol. 6, No. 1, pp. 1-57, Jan. 2005.

(56) References Cited

OTHER PUBLICATIONS

A. Cichocki and A. Belouchrani, "Source separation of temporally correlated sources from noisy data using a bank of band pass filters," in Proc. of Independent Component Analysis and Signal Separation (ICA-2001), pp. 173-178, San Diego, USA, Dec. 9-13, 2001.
A. Hyvarinen, "Complexity Pursuit: Separating Interesting Components from Time Series," Neural Computation, vol. 13, No. 4, pp. 883-898, Apr. 2001.
C. Igel and M. Husken, "Improving the Rprop learning algorithm," in Proc. of the $2^{nd}$ Int. Symposium on Neural Computation (NC'2000), pp. 115-121, ICSC Academic Press, 2000.
D. Verstraeten et al., "An experimental unification of reservoir computing methods," Neural Networks, 20(3), pp. 391-403, 2007.
Extended European Search Report dated Sep. 25, 2019 for European Patent Application No. 19170599.5, 6 pages.
Chinese First Office Action dated May 21, 2020 for Chinese Patent Application No. 201710683990.7, 5 pages.
Appeltant, L.; et al.; "Information processing using a single dynamical node as complex system," Nature Communications, 2011, pp. 1-6.
Candes, Emmanuel J.; et al.; "Near-Optimal Signal Recovery From Random Projections: Universal Encoding Strategies?" IEEE Transactions on Information Theory, 2006, pp. 5406-5425, vol. 52.
Jaeger, Herbert, et al.; "Harnessing Nonlinearity: Predicting Chaotic Systems and Saving Energy in Wireless Communication," Science, 2004, pp. 78-80, vol. 304.
Legenstein, Robert, et al.; "Edge of chaos and prediction of computational performance for neural circuit models," Neural Networks, 2007, pp. 323-334, vol. 20.
Maass, Wolfgang, "Liquid Computing," Lecture Notes in Computer Science, 2007, pp. 507-516.
Mann, Steve, et al.; "The Chirplet Transform: A Generalization of Gabor's Logon Transfrom," Proc. Vision Interface, 1991, pp. 205-212.
Takens, Floris, "Detecting strange attractors in turbulence," Dynamical Systems and Turbulence, Lecture Notes in Mathematics, 1981, pp. 366-381, vol. 898.
Walden, Robert H.; "Analog-to-Digital Converter Survey and Analysis," IEEE Journal on Selected Areas in Communications, 1999, pp. 539-548, vol. 17.
Yap, Han Lun, et al.; "A First Analysis of the Stability of Takens' Embedding," IEEE Global Conference on Signal and Information Processing Symposium on Information Processing for Big Data, 2014, pp. 404-408.
Extended European Search Report dated Feb. 27, 2019 for European Patent Application No. 18194748.2, 14 pages.

\* cited by examiner

BELOW-NOISE AFTER TRANSMIT (BAT) CHIRP RADAR

CROSS-REFERENCE TO RELATED APPLICATIONS

This application claims the benefit of U.S. Provisional Application No. 62/577,076, filed Oct. 25, 2017 which is incorporated herein by reference.

FIELD

The present disclosure relates to radars and radar systems and more particularly to a below-noise after transmit (BAT) Chirp Radar.

BACKGROUND

Detecting below-noise radio frequency (RF) signals, such as radar signals involves de-noising the RF signals or radar signals to obtain a useable signal or radar return that can be processed to extract the desired information. State-of-the-art systems for measuring the range to targets or terrain over an ultra-wide bandwidth (greater than about 30 Giga Hertz (GHz), enabling high resolution) at long range require high rate analog-to-digital converters (ADCs) and some combination of a high power transmitter or a large antenna aperture. Such high-rate ADCs are expensive and consume a substantial amount of power, and due to fundamental physical limits, are not capable of achieving a sampling rate needed to capture an ultra-wide bandwidth as defined above. To mitigate this, current wideband radar systems use chirp or step-chirp waveforms that are de-chirped upon receipt, increasing the required length of the transmit pulse and constraining the operational range for target detection to a particular range window. Additionally, the detection algorithms of current radar systems are typically based on the fast Fourier transform, with high computational complexity and memory requirements that make it difficult to operate such systems in real-time over an ultra-wide bandwidth. The high power transmitters needed to detect targets at long range with sufficient signal-to-noise ratio (SNR) require a substantial amount of instantaneous power. This can be mitigated with a larger antenna; however, increasing aperture size to reduce transmit power increases weight which makes the approach infeasible for applications were there are significantly low size, weight and power requirements.

Conventional methods for de-noising fall into two categories: filter-based methods, and training-based approaches. Filter-based methods use filtering to smooth out noise from a signal, but are too simplistic to simultaneously maintain the low-frequency long-term trends of a signal while adapting to the high-frequency abrupt transitions. Training-based methods rely on a "dictionary" that models the signals of interest. Such a dictionary must be trained in an offline process, and requires training data that may not be available. In addition, the dictionary often requires a large amount of memory and computation to be stored and leveraged on a platform rendering such methods impractical for applications where small size, weight and fast performance are important characteristics.

SUMMARY

In accordance with an embodiment, a radar system includes a transmit antenna for transmitting a radio frequency (RF) signal or a radar signal and a receive antenna for receiving a plurality of reflected signals created by a plurality of targets reflecting the RF signal or radar signal. The reflected signals are received with noise. The radar system also includes an analog-to-digital converter (ADC) that digitizes or samples the reflected signals to provide a digitized or sampled noisy input signal. The radar system also includes a reservoir computer that receives the noisy input signal. The reservoir computer includes a time-varying reservoir and is configured to de-noise the noisy input signal and provide a range measurement for each of the plurality of targets.

In accordance with an embodiment and any of the previous embodiments, the reservoir computer includes a cognitive radar processor. The cognitive radar processor includes the time-varying reservoir. The time-varying reservoir includes a multiplicity of time-varying reservoir states and the time-varying reservoir is configured to linearly map the noisy input signal into respective reservoir states to create a high-dimensional state-space representation of the noisy input signal.

In accordance with an embodiment and any of the previous embodiments, the cognitive radar processor includes a delay embedding module. The delay embedding module is configured to receive a reservoir state signal corresponding to each respective time-varying reservoir state and to generate a delay embedded reservoir state signal corresponding to each time-varying reservoir state that represents a history of the time-varying reservoir states or reservoir state dynamics over a time period based on a predetermined time delay of the delay embedding module. The delay embedding module also includes a weight adaptation module that receives the delay embedded reservoir state signals. The weight adaptation module is configured to produce a de-noised reservoir state signal for each time-varying reservoir state or reservoir state signal. The de-noised reservoir state signals correspond to the noisy input signal being de-noised to provide a de-noised input signal.

In accordance with an embodiment and any of the previous embodiments, the weight adaptation module is configured to produce a prediction of the noisy input signal at a predetermined future time from the delay embedded reservoir state signals and to use the prediction of the noisy input signal to de-noise each reservoir state signal using a gradient descent learning algorithm. The weights of the weight adaptation module are determined using the gradient descent learning algorithm.

In accordance with an embodiment and any of the previous embodiments, the cognitive radar processor includes a time-varying reservoir. The time-varying reservoir including a multiplicity of time-varying reservoir states and the time-varying reservoir is configured to linearly map the noisy input signal into respective reservoir states to create a high-dimensional state-space representation of the noisy input signal. The cognitive radar processor also includes a delay embedding module. The delay embedding module is configured to receive a reservoir state signal corresponding to each respective time-varying reservoir state and to generate a delay embedded reservoir state signal corresponding to each time-varying reservoir state that represents a history of the time-varying reservoir states or reservoir state dynamics over a time period based on a predetermined time delay of the delay embedding module. The cognitive radar processor further includes a weight adaptation module that receives the delay embedded reservoir state signals. The weight adaptation module is configured to produce a de-noised reservoir state signal for each reservoir state or reservoir state signal. The de-noised reservoir state signals correspond to the noisy input signal being de-noised to provide a de-noised input signal.

In accordance with an embodiment and any of the previous embodiments, the cognitive radar processor further includes a chirplet transform module that receives de-noised reservoir states or the de-noised reservoir state signals, corresponding to the de-noised input signal, from the weight adaptation module and generates a real-time de-noised spectrogram of the de-noised input signal representing the reflected signals from the plurality of targets. The chirplet transform module is configured to map each of the de-noised reservoir states or de-noised reservoir state signals to the range measurement of each of the plurality of targets.

In accordance with an embodiment and any of the previous embodiments, the de-noised reservoir states define a bank of time-varying filters at a chirp rate set by a transmit chirp of the RF signal or the radar signal. A response of the time-varying filters to chirps received at different times are equivalent to a response of a bank of 1-pole infinite impulse response (IIR) filters to different frequencies.

In accordance with an embodiment and any of the previous embodiments, the radar system further includes an integration module for integrating the real-time de-noised spectrogram of the de-noised input signal to create an integrated de-noised spectrogram and for mapping the integrated de-noised spectrogram to the range measurements. The integration module is configured to increase a signal-to-noise ratio of each de-noised reservoir state signal by pulse compression by integrating or summing an output of each de-noised reservoir state signal.

In accordance with an embodiment and any of the previous embodiments, the time-varying reservoir includes a recurrent neural network including a plurality of nodes. Each node corresponding to one of the time-varying reservoir states.

In accordance with an embodiment and any of the previous embodiments, the time-varying reservoir includes a state transition matrix having a predetermined block diagonal structure that is optimized for signal de-noising and efficient implementation in hardware.

In accordance with an embodiment and any of the previous embodiments, the delay embedding module includes a delay embedded reservoir state vector that has a different state transition matrix to enable time-varying dynamics.

In accordance with an embodiment and any of the previous embodiments, wherein the reservoir computer includes a cognitive radar processor and the cognitive radar processor is configured to perform a set of functions including receiving the noisy input signal, the noisy input signal being a time-series of data points from the plurality of reflected signals sampled from a bandwidth greater than about 30 GHz; linearly mapping the noisy input signal into the time-varying reservoir, the time-varying reservoir comprising a multiplicity of time-varying reservoir states; creating a high-dimensional state-space representation of the reflected signals by combining the noisy input signal with the time-varying reservoir states of the time-varying reservoir; generating a delay embedded reservoir state signal from each time-varying reservoir state that provides a finite temporal record of the reservoir state dynamics or history of the time-varying reservoir states; de-noising each time-varying reservoir state which corresponds to de-noising the noisy input signal so that noise is removed and signals corresponding to the reflected signals without noise remain; generating a real-time de-noised time-varying spectrogram of the noisy input signal from the de-noised reservoir states or de-noised reservoir state signals; integrating the de-noised time-varying spectrogram in an output layer of the cognitive radar processor; and mapping the integrated de-noised time-varying spectrogram to the range measurement for each of the plurality of targets.

In accordance with an embodiment and any of the previous embodiments, the RF signal or radar signal includes a chirped or step-chirped waveform.

In accordance with another embodiment, a method for enhancing an RF signal or a radar signal includes using predictive filtering including a time-varying reservoir computer. The method also includes analyzing an RF signal or return radar signal. The RF signal or return radar signal includes an information signal and receiver and background noise. The method additionally includes separating a predictive signal pattern from an unpredictable noise pattern. The unpredictable noise pattern being identifiable in response to being separated. The method also includes applying an inverse noise signal to the RF signal or return radar signal to cancel the unpredictable noise pattern. The inverse noise signal corresponds to the unpredictable noise pattern. The method further includes generating an enhanced RF signal or return radar signal in response to cancelling the unpredictable noise pattern.

In accordance with another embodiment, a system for enhancing an RF signal or a radar signal includes a "cognitive" radar processor (CRP) that can de-noise an input signal that contains a mixture of waveforms over a very large (>30 GHz) bandwidth. The cognitive radar processor includes a reservoir computer (RC), which maps an input signal to a high-dimensional dynamical system known as the reservoir. The cognitive radar processor additionally includes a delay embedding that creates a finite temporal record of the values of the reservoir states. The cognitive radar processor further includes a weight adaptation module that adapts the output of the reservoir computer via gradient descent to produce a prediction of the input signal a small time-step in the future. Since the noise in the input signal is inherently random and unpredictable, the predicted input signal will be free of noise. The error between the predicted input signal and actual input signal is used by the weight adaptation module to further tune the output weights of the reservoir in an iterative process.

In accordance with an embodiment and any of the previous embodiments, the static reservoir computer includes a time-varying reservoir that is able to detect and de-noise non-stationary signals, such as chirp signals.

In accordance with an embodiment and any of the previous embodiments, a method for enhancing an RF signal or a radar signal includes cancelling out noise from a received signal by providing an inverse noise signal using a time dependent or time-varying reservoir computer.

In accordance with an embodiment and any of the previous embodiments, a method for measuring range to each of a plurality of targets, includes receiving a noisy input signal by a cognitive radar processor. The noisy input signal includes a plurality of reflected RF signals or radar signals from a plurality of targets. The method also includes using predictive filtering including a time-varying reservoir to analyze the noisy input signal. The method additionally includes analyzing the noisy input signal to separate a predictive signal pattern from an unpredictable noise pattern. The method also includes applying an inverse noise signal to the noisy input signal to cancel the unpredictable noise pattern. The inverse noise signal corresponds to the unpredictable noise pattern. The method also includes generating an enhanced RF signal or return radar signal in response to cancelling the unpredictable noise pattern from the predictive signal pattern. The method further includes mapping the enhanced RF signal or return radar signal to range measurements for each of the targets.

In accordance with an embodiment and any of the previous embodiments, a method for measuring range to each of a plurality of targets includes receiving a noisy input signal by a cognitive radar processor. The noisy input signal includes a time-series of data points sampled from a plurality of reflected signals from the plurality of targets sampled from a bandwidth greater than about 30 GHz. The method also includes linearly mapping the noisy input signal into the time-varying reservoir. The time-varying reservoir includes a multiplicity of time-varying reservoir states. The method also includes creating a high-dimensional state-space representation of the reflected signals by combining the noisy input signal with the time-varying reservoir states of the time-varying reservoir. The method additionally includes generating a delay embedded reservoir state signal from each time-varying reservoir state that provides a finite temporal record of the reservoir state dynamics or history of the time-varying reservoir states. The method additionally includes de-noising each time-varying reservoir state which corresponds to de-noising the noisy input signal so that noise is removed and signals corresponding to the reflected signals without noise remain. The method also includes generating a real-time de-noised time-varying spectrogram of the noisy input signal from the de-noised reservoir states or de-noised reservoir state signals. The method further includes integrating the de-noised time-varying spectrogram in an output layer of the cognitive radar processor and mapping the integrated de-noised time-varying spectrogram to the range measurement for each of the plurality of targets.

The features, functions, and advantages that have been discussed can be achieved independently in various embodiments or may be combined in yet other embodiments further details of which can be seen with reference to the following description and drawings.

DETAILED DESCRIPTION

Figure 1:
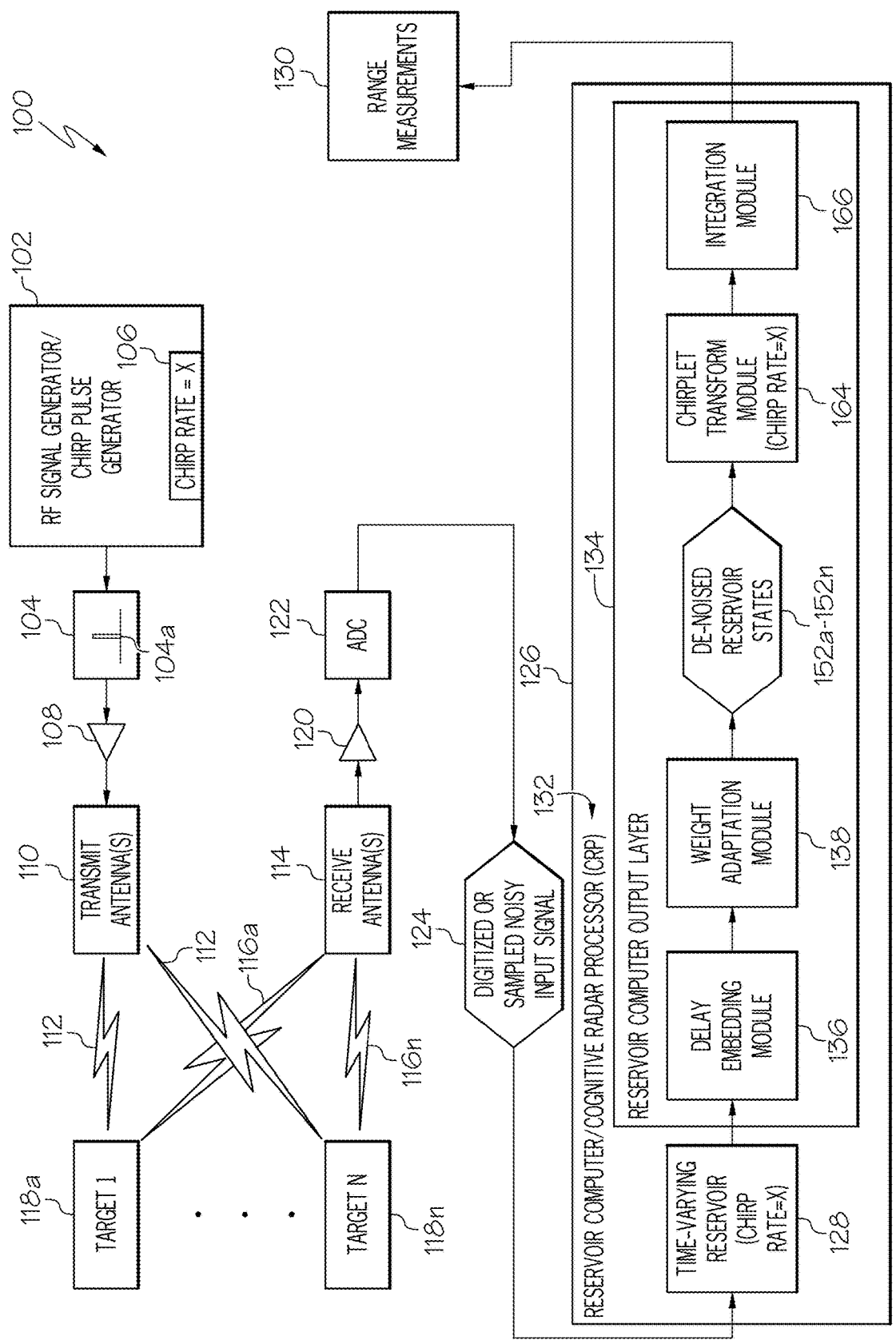
FIG. 1 is a block schematic diagram of an example of a radar system in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The embodiments described herein are applicable to radar receivers or radar systems that can perform real-time processing of signals over an ultra-wide bandwidth. The exemplary embodiments provide expanded situational awareness, providing the core functionality required for ultra-low latency signal detection and analysis over about a 30 GHz instantaneous bandwidth to enable real-time resource allocation based on the RF environment. This performance can be achieved on computing platforms with orders of magnitude lower size, weight, and power. The time-varying reservoir computer described enables rapid de-noising and detection of non-stationary signals such as chirps that are widely used in radar systems on a wide variety of platforms.

In addition to aerospace applications, such as onboard aircraft or in space rendezvous operations, the cognitive radar processor described herein has other application enabling multi-static radar and cognitive radio in low signal-to-noise ratio (SNR) conditions. The time-varying reservoir computer is particularly useful to detect and track frequency-modulated continuous wave (FMCW) signals or chirp pulses that are used in a wide variety of automotive radar systems.

Additional capabilities of the CRP or reservoir computer include generating a real-time time-varying spectrogram that further facilitates situational awareness for piloted airborne platforms or vehicles, unmanned aerial vehicles (UAV), or automated or piloted space platforms.

FIG. 1 is a block schematic diagram of an example of a radar system 100 in accordance with an embodiment of the present disclosure. In accordance with an example described herein, the radar system 100 is a below-noise after transmit (BAT) chirp radar. The radar system 100 includes a radio frequency (RF) signal generator 102 for generating an RF signal or radar signal. In accordance with an embodiment, the RF signal generator 102 is a chirp pulse generator that is adjustable to generate a chirp pulse 104 at a predetermined chirp rate 106 or chirp rate that is selectable by a user. Accordingly, in accordance with an embodiment, the RF signal comprises a chirped or step chirped waveform 104a. An amplifier 108 amplifies the chirp pulse 104.

The radar system 100 also includes a transmit antenna 110 or antennas for transmitting the RF signal 112 or radar signal amplified by the amplifier 108. The radar system 100 additionally includes a receive antenna 114 or antennas for receiving a plurality of reflected signals 116a-116n created by a plurality of targets 118a-118n reflecting the RF signal 112 or radar signal. The reflected signals 116a-116n include background noise. A receive amplifier 120 amplifies the received reflected signals 116a-116n and adds receiver noise.

An analog-to-digital converter (ADC) 122 digitizes or samples the plurality of reflected signals 116a-116n to provide a digitized or sampled noisy input signal 124. A reservoir computer 126 receives the noisy input signal 124 from the ADC 122. The reservoir computer 126 includes a time-varying reservoir 128. The reservoir computer 126 is configured to de-noise the noisy input signal 124 and to provide a range measurement 130 for each of the plurality of targets 118a-118n as described in more detail herein. An example of the reservoir computer 126 and components of the reservoir computer 126 will be described in more detail with reference to FIGS. 2-4. The reservoir computer 126 includes a cognitive radar processor 132 or may also be referred to as a cognitive radar processor 132.

The reservoir computer 126 or cognitive radar processor 132 includes the time-varying reservoir 128. The reservoir computer 126 or cognitive radar processor 132 also includes a reservoir computer output layer 134. The reservoir computer 126 or cognitive radar processor 132 additionally includes a delay embedding module 136 and a weight adaptation module 138. In accordance with an embodiment, the delay embedding module 136 and the weight adaptation module 138 are components of the reservoir computer output layer 134.

Figure 2:
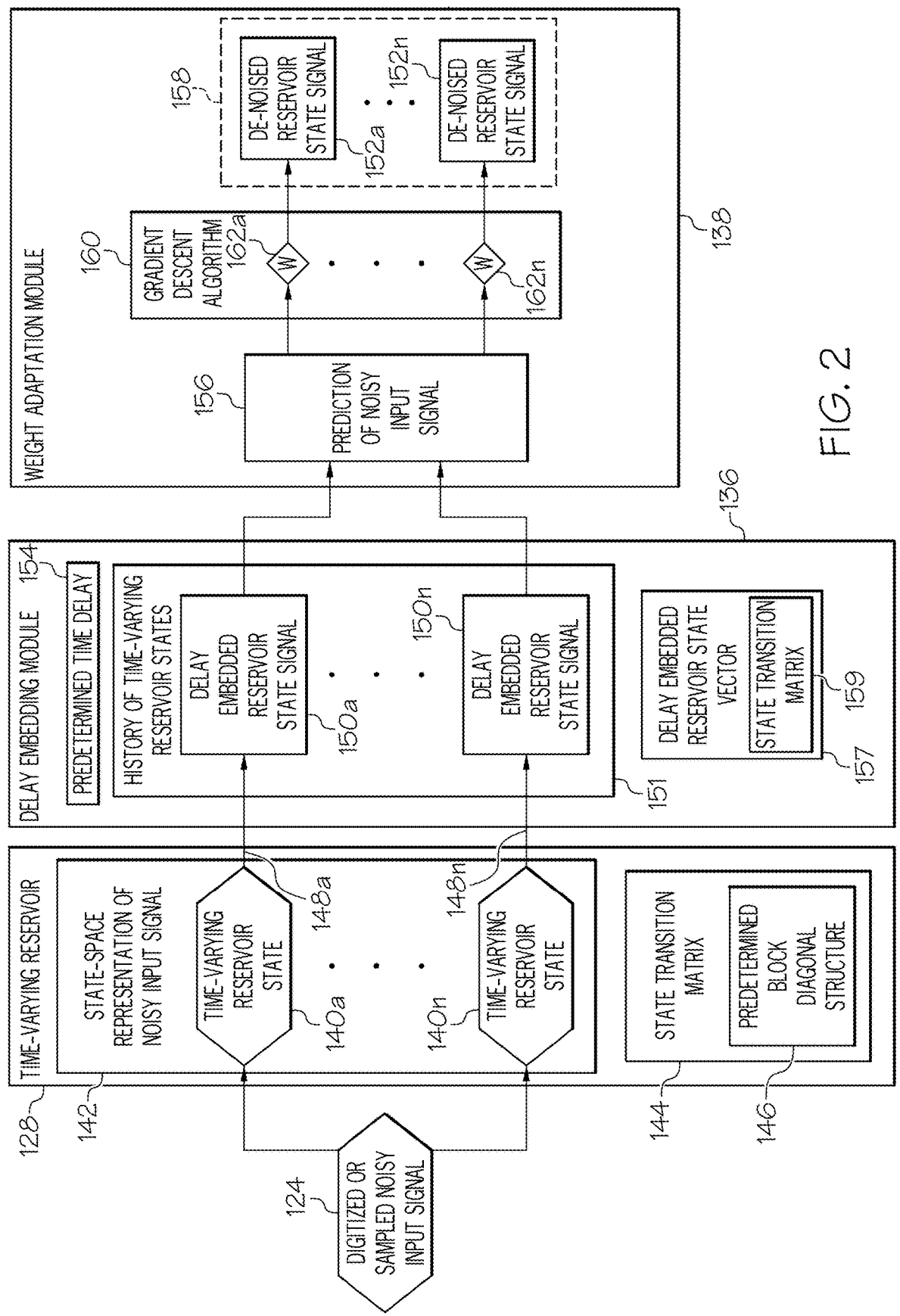
FIG. 2 is a block schematic diagram of an example of a time-varying reservoir, delay embedding module and weight adaptation module in accordance with an embodiment of the present disclosure.

Referring also to FIG. 2, FIG. 2 is a block schematic diagram of an example of the time-varying reservoir 128, delay embedding module 136 and weight adaptation module 138 in accordance with an embodiment of the present disclosure. As described in more detail herein, the reservoir computer 126 including the time-varying reservoir 128, delay embedding module 136 and weight adaptation module 138 analyze the noisy input signal 124 using predictive filtering at block 904 in FIG. 9 to separate a predictive signal pattern and unpredictable noise pattern at block 906 in FIG. 9. The time-varying reservoir 128 includes a multiplicity of time-varying reservoir states 140$a$-140$n$. The time-varying reservoir 128 is configured to linearly map the noisy input signal 124 into respective reservoir states 140$a$-140$n$ to create a high-dimensional state-space representation 142 or multi-dimensional state-space representation of the noisy input signal 124. As described in more detail herein, the time-varying reservoir 128 includes a state transition matrix 144 that includes a predetermined block diagonal structure 146 that is optimized for signal de-noising and efficient implementation in hardware as described in more detail herein.

In accordance with an embodiment, the time-varying reservoir 128 includes a recurrent neural network 402 (FIG. 4) including a plurality of reservoir nodes 404. Each reservoir node 404 corresponding to one of the time-varying reservoir states 140$a$-140$n$.

The delay embedding module 136 is configured to receive a reservoir state signal 148$a$-148$n$ corresponding to each respective time-varying reservoir state 140$a$-140$n$ and to generate a delay embedded reservoir state signal 150$a$-150$n$ corresponding to each time-varying reservoir state 140$a$-140$n$ that represents a history 151 of the time-varying reservoir states 140$a$-140$n$ or reservoir state dynamics over a short-time period based on a predetermined time delay 154 of the delay embedding module 136. The short-time period or predetermined time period is based on the frequency of the received signal, which would be a predetermined time based on the operating frequency of the radar. The delay embedding module 136 includes a delay embedded reservoir state vector 157 that has a different state transition matrix 159 compared to the state transition matrix 144 of the time-varying reservoir 128 to enable time-varying dynamics.

The weight adaptation module 138 receives the delay embedded reservoir state signals 150$a$-150$n$ from the delay embedding module 136. The weight adaptation module 138 is configured to produce a de-noised reservoir state signal 152$a$-152$n$ for each time-varying reservoir state 140$a$-140$n$ or reservoir state signal 148$a$-148$n$. The de-noised reservoir state signals 152$a$-152$n$ corresponds to the noisy input signal 124 being de-noised to provide a de-noised input signal 158. The weight adaptation module 138 is configured to produce a prediction 156 of the noisy input signal 124 (input signal including noise) at a predetermined future time from the delay embedded reservoir state signals 150$a$-150$n$ and to use the prediction 156 of the noisy input signal 124 to separate the noise from (de-noise) the noisy input reservoir state signals 148$a$-148$n$ using a gradient descent learning algorithm 160. Weights 162$a$-162$n$ of the weight adaptation module 138 are determined using the gradient descent learning algorithm 160. Accordingly, the weight adaptation module 138 is configured to use predictive filtering to separate a predictive signal pattern from an unpredictable noise pattern (blocks 904 and 906 in FIG. 9). The gradient descent learning algorithm 160 predicts next samples of a predictable part of the noisy input signal 124 and determines a difference between samples as the unpredictable noise pattern. An inverse noise signal corresponding to the unpredictable noise pattern is applied to the prediction 156 of the noisy input signal 124 to cancel the unpredictable noise pattern (block 908 in FIG. 9) and provide the de-noised input signal 158 or enhanced RF signal or return radar signal (block 910 in FIG. 9) without the noise cancelled.

Figure 3:
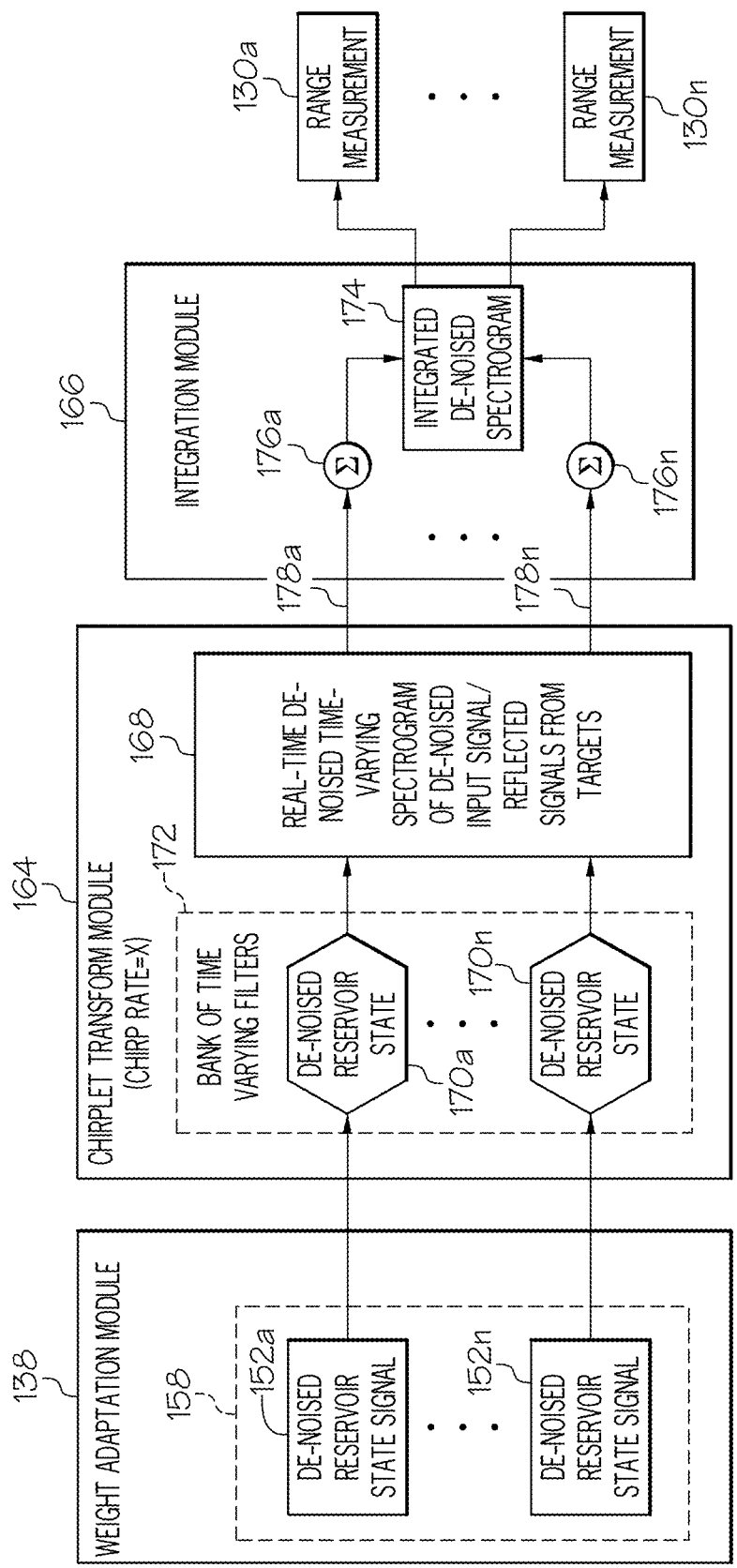
FIG. 3 is a block schematic diagram of an example of a chirplet transform module and integration module on accordance with an embodiment of the present disclosure.

Referring to FIG. 1 and FIG. 3, the reservoir computer 126 or cognitive radar processor 132 further includes a chirplet transform module 164 and an integration module 166. FIG. 3 is a block schematic diagram of an example of the chirplet transform module 164 and integration module 166 in accordance with an embodiment of the present disclosure. The chirplet transform module 164 receives the de-noised reservoir states or de-noised reservoir state signals 152$a$-152$n$, corresponding to the de-noised input signal 158, from the weight adaptation module 138. The chirplet transform module 164 generates a real-time de-noised time-varying spectrogram 168 of the de-noised input signal 158 representing the reflected signals 116$a$-116$n$ from the plurality of targets 118$a$-118$n$. The real-time de-noised time-varying spectrogram 168 may also be represented as a chirplet spectrogram via a mathematical transformation. The chirplet transform module 164 is configured to map each of the de-noised reservoir states 170$a$-170$n$ or de-noised reservoir state signals 152$a$-152$n$ to the range measurement 130 of each of the plurality of targets 118$a$-118$n$. The de-noised reservoir states 170$a$-170$n$ define a bank of time-varying filters 172 at a chirp rate 106 set by the transmit chirp pulse 104 of the transmitted RF signal 112 or the radar signal. A response of the time-varying filters 172 to chirps received at different times are equivalent to a response of a bank of 1-pole infinite impulse response (IIR) filters to different frequencies.

The integration module 166 is configured for integrating the real-time de-noised time-varying spectrogram 168 of the de-noised input signal 158 to create an integrated de-noised spectrogram 174 and for mapping the integrated de-noised spectrogram 174 to the range measurements 130$a$-130$n$. The integration module 166 is configured to increase a signal-to-noise ratio of each de-noised reservoir state signal 152$a$-152$n$ by pulse compression including integrating or summing an output 178$a$-178$n$ of each de-noised reservoir state 170$a$-170$n$ or de-noised reservoir state signal 152$a$-152$n$. In accordance with an embodiment, the integration module 166 includes a plurality of summing nodes 176$a$-176$n$ for integrating each of the de-noised input signals 158 represented in the real-time de-noised time-varying spectrogram 168.

Figure 4:
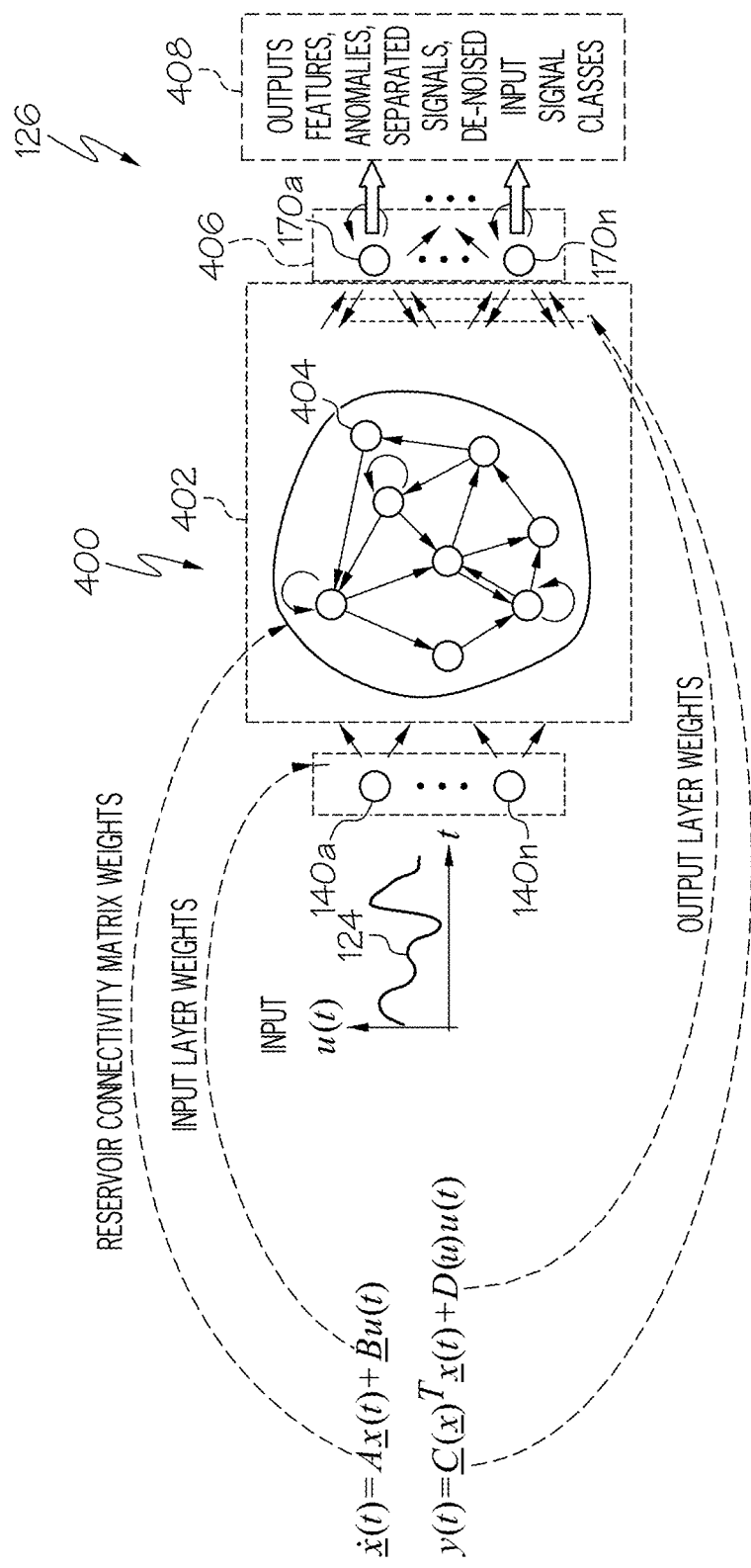
FIG. 4 is a diagram of an example of time-varying reservoir computer in accordance with an embodiment of the present disclosure.

Referring also to FIG. 4, FIG. 4 is a diagram of an example of the time-varying reservoir computer 126 in accordance with an embodiment of the present disclosure. The reservoir computer 126 includes a cognitive signal de-noising architecture 400 that is based on a form of neuromorphic (brain-inspired) signal processing known as reservoir computing. Reservoir computing is a special form of a recurrent neural network 402 (a neural network with feedback connections) that operates by projecting the input signal vector or input signal 124 into a high-dimensional reservoir state space representation 142 (FIG. 2) which contains an equivalent dynamical model of the signal generation process capturing all of the available and actionable information about the input signal 124. The reservoir computer 126 has readout layers 406 that can be trained, either off-line or on-line, to learn desired outputs by utilizing state functions. Accordingly, the reservoir computer 126 has the power of a recurrent neural network 402 to model non-stationary (time-varying) processes and phenomena, but with simple readout layers 406 and training algorithms that are both accurate and efficient.

The reservoir computer 126 is configured to implement an adaptable state-space filter or time-varying filters 172 (FIG. 3). A linear reservoir computer has the following state-space representation:

$$\dot{\underline{x}}(t) = \underline{A}\underline{x}(t) + \underline{B}u(t)$$

$$y(t) = \underline{C}(t)^T \underline{x}(t) + D(t)u(t)$$

Where $\underline{A}$ is the reservoir connectivity matrix that determines the filter pole locations, $\underline{B}$ is the vector mapping the input to the reservoir, $\underline{C}(t)$ is the set of tunable output layer weights 162a-162n that map the reservoir states 140a-140n to the output or de-noised reservoir state signals 152a-152n and determine the filter zero locations, and D(t) is the (rarely used) direct mapping from input to output. Similarly, the output layer weights ($\underline{C}$) determine the filter zero locations. FIG. 4 illustrates the direct correspondence between parameters of the state-space representation 142 and components in the reservoir computer 126. As the tunable output layer weights 162a-162n are adaptable, the reservoir computer 126 implements an adaptable state-space filter where the poles are fixed, but the zeros are adapted in real-time based on the input signal 124. The reservoir computer 126 maps an input signal vector or input signal 124 to the high-dimensional state-space representation 142 that models the underlying time-varying dynamics of the signal generation process. The reservoir states 140a-140n can be mapped to useful outputs 408, including de-noised inputs, signal classes, separated signals, and anomalies using the trainable linear readout layers 406. There is a direct correspondence between state-space representation components and parameters in the reservoir computer 126.

In conventional reservoir computers, the weights in both the reservoir connectivity matrix ($\underline{A}$) and the input-to-reservoir mapping vector ($\underline{B}$) are typically chosen randomly (e.g., entries of $\underline{A}$ and $\underline{B}$ can be independent, identically distributed samples from a zero-mean, unit variance Gaussian distribution). The reservoir state update require computation proportional to the square of the number of reservoir nodes 404, which become infeasible for low-power hardware instantiations as the number of reservoir nodes 404 increases.

Because the reservoir computer 126 is a linear dynamical system, a linear transformation $\underline{T}$ can be applied to obtain a new state vector $\acute{\underline{x}}(t) = \underline{T}\underline{x}(t)$, to provide an equivalent dynamical system:

$$\dot{\acute{\underline{x}}}(t) = \underline{\acute{A}}\acute{\underline{x}}(t) + \underline{\acute{B}}u(t)$$

$$y(t) = \underline{\acute{C}}(t)^T \acute{\underline{x}}(t) + \acute{D}(t)u(t),$$

Where $\underline{\acute{A}} = \underline{T}\underline{A}\underline{T}^{-1}, \underline{\acute{B}} = \underline{T}\underline{B}, \underline{\acute{C}}(t) = \underline{T}^{-1^T}\underline{C}(t)$, and $\acute{D}(t) = D(t)$ This dynamical system has the exact same input/output behavior as the original system, but with the appropriate choice of $\underline{T}$, the reservoir transition matrix $\underline{\acute{A}}$ can be designed to have diagonal or block diagonal structure. This will enable the computation of the reservoir state update to scale linearly with the number of reservoir nodes 404, thus enabling efficient implementation in low-power hardware.

In accordance with an embodiment, the reservoir state transition matrix $\underline{\acute{A}}$ is constructed such that it is in a 2×2 block diagonal form. Each 2×2 block in the state matrix $\underline{\acute{A}}$ corresponds to a single pole Infinite Impulse Response (IIR) filter. Using standard IIR filter design techniques, the placement of the pole for each 2×2 block can be selected so that the reservoir state matrix in aggregate models a bank of IIR filters or bank of time-varying filters 172. For example, for a real passive IIR filter, the matrix $\underline{\acute{A}}$ must have eigenvalues that are purely real and negative corresponding to purely damped modes or eigenvalues that come in complex conjugate pairs, with negative real parts to the eigenvalues. Thus, the block-diagonal matrix $\underline{\acute{A}}$ will have the form:

$$\underline{\acute{A}} = \begin{pmatrix} \lambda_{r,1} & \lambda_{i,1} & 0 & 0 & 0 & \ldots & 0 & 0 \\ -\lambda_{i,1} & \lambda_{r,1} & 0 & 0 & 0 & \ldots & 0 & 0 \\ 0 & 0 & \lambda_{r,2} & \lambda_{i,2} & 0 & \ldots & 0 & 0 \\ 0 & 0 & -\lambda_{i,2} & \lambda_{r,2} & 0 & \ldots & 0 & 0 \\ 0 & 0 & 0 & 0 & \ddots & \ddots & \vdots & \vdots \\ \vdots & \vdots & \vdots & \vdots & \ddots & \ddots & 0 & 0 \\ 0 & 0 & 0 & 0 & \ldots & 0 & \lambda_{r,p} & \lambda_{i,p} \\ 0 & 0 & 0 & 0 & \ldots & 0 & -\lambda_{i,p} & \lambda_{r,p} \end{pmatrix}$$

Here p is the number of complex conjugate poles, with N=2p, $\{\lambda_{r,k}\}_{k=1}^{P}$ correspond to the real components of the eigenvalues (that are always negative) of $\underline{\acute{A}}$ and $\{\pm\lambda_{i,k}\}_{k=1}^{P}$ are the imaginary components of the eigenvalues of $\underline{\acute{A}}$.

Phase delay embedding used in delay embedding module 136 is a technique developed in dynamical system theory to model the dynamics of a chaotic system from its observation $u_0(t)$ using delayed versions of the observation as a new input vector $\underline{u}(t)$. To use phase delay embedding theory, an unknown (potentially chaotic) dynamical system is assumed embedded in an N-dimensional state space having an m-dimensional attractor. This means that though the state space has N parameters, signals from the dynamical system form trajectories that all lie on an m-dimensional sub-manifold M of the state space, and can theoretically (though not practically) be specified by as few as m parameters. The observations (received signal) $u_0(t) = h[\underline{\tilde{x}}(t)]$ is a projection of the state space. The phase delay embedding produces a new input vector $\underline{u}(t)$ from n delayed versions of the observation signal $u_0(t)$ concatenated together. According to Takens' theorem, given fairly broad assumptions on the curvature of the sub-manifold M and the nondegenerate nature of the projection h[·], if the number of delay coordinate dimensionality n>2m+1, then the phase delay embedding $\underline{u}(t)$ preserves the topological structure (i.e., shape) of the dynamical system, and thus can be used to reconstruct the dynamical system from observations.

Figure 5:
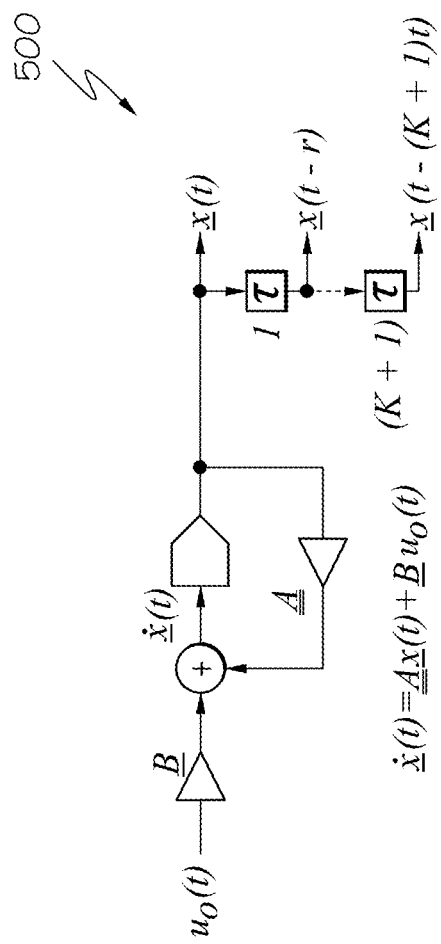
FIG. 5 is a schematic diagram of an example of a dynamic reservoir in accordance with an embodiment of the present disclosure.

Referring also to FIG. 5, FIG. 5 is a schematic diagram of an example of a dynamic reservoir 500 in accordance with an embodiment of the present disclosure. As shown in FIG. 5, the delay-embedding is applied to each of the reservoir states 140a-140n (FIG. 2) to obtain the short-time history of the reservoir state dynamics or history 151 of the time-varying reservoir states 140a-140b. In accordance with an example, a short-term prediction method is used for signal de-noising. Given that delay-embedded observations can effectively model dynamical system behavior, the history 151 of these reservoir states 140a-140n are leveraged or used to perform short-term predictions of the observations. The reservoir computer 126 is used to learn the prediction function F:

$$\tilde{u}_0(t+\tau) = F[u_0(t)]$$

In accordance with an embodiment, the cognitive radar processor 132 includes a wideband (up to 30 GHz) frontend that provides input to the dynamic reservoir 500. The wideband frontend refers to antennas, amplifiers, ADCs, etc. before the reservoir computer 126 that are configured to handle or support a desired wide bandwidth. The weights 162a-162n of the output layer 134 are adapted via the gradient descent learning algorithm 160 described below. The gradient descent learning algorithm 160 is based on short-time prediction of the input signal 124, seeking to represent the output as a linear combination of the historical reservoir states. Because noise is random and unpredictable, the predicted signal $y(t) = \tilde{u}_0(t+\tau)$ will be free of noise.

The dynamic reservoir 500 in FIG. 5 satisfies the following set of coupled ordinary differential equations (ODE):

$$\dot{x}(t) = \underline{A}x(t) + \underline{B}u_0(t)$$

$$y(t) = \sum_{k=1}^{K+1} \underline{c}_k(t)^T x(t-(k-1)\tau) + \underline{d}(t)^T \underline{u}(t),$$

Where $\underline{u}(t) = [u_0(t), u_0(t-\tau), \ldots, u_0(t-K\tau)]^T$.

To perform short-time prediction of the input signal 124, the gradient descent learning algorithm 160 is used. The idea is to enforce exact prediction of the current time point that is used in the delay embedding module 136. The predicted input value at time $(t+\tau)$ is calculated from the current value of the output weights $(\underline{c}_k(t), \underline{d}(t))$ 162a-162n and the current and past values of the states $(\underline{x})$ and the input $(u)$. The quadratic error function to be minimized is given by:

$$E[\underline{c}_1, \ldots, \underline{c}_{K+1}, \underline{d}] \doteq [u_0(t) - \tilde{y}(t-\tau)]^2 + \lambda_c \sum_{k=1}^{K+1} \|\underline{c}_k(t)\|^2 + \lambda_d \|\underline{d}(t)\|^2,$$

Where $\lambda_c$ and $\lambda_d$ are parameters that weight the importance of the output weights $\{\underline{c}_k\}_{k=1}^{K+1}$ and $\underline{d}$, and $$\tilde{y}(t-\tau) = \sum_{k=1}^{K+1} \underline{c}_k(t)^T x(t-k\tau) + \underline{d}(t)^T \underline{u}(t-\tau).$$

Note that $\tilde{y}(t-\tau)$ is the delayed output expressed by the delayed value of $\underline{x}$ and $u$ and the current values of the output weights $\{\underline{c}_k\}_{k=1}^{K+1}$ and $\underline{d}$, and thus in general, $\tilde{y}(t-\tau) \neq y(t-\tau)$. However, this approximation is reasonable, and allows the system to not require storage of time histories of output weights, facilitating a more efficient hardware implementation.

To minimize the quadratic error, $E[\underline{c}_1, \ldots, \underline{c}_{K+1}, \underline{d}]$, the gradients of $E[\underline{c}_1, \ldots, \underline{c}_{K-1}, \underline{d}]$ are computed with respect to $\{\underline{c}_k\}_{k=1}^{K+1}$ and $\underline{d}$. Based on these gradients, the weight updates to $\{\underline{c}_k(t)\}_{k=1}^{K+1}$ and $\underline{d}(t)$ satisfy the following ordinary differential equations (ODEs):

$$\dot{\underline{c}}_k(t) = -g_c \underline{c}_k(t) + \mu_c \tilde{\varepsilon}(t)\underline{x}(t-k\tau), k=1,2,\ldots,K+1$$

$$\dot{\underline{d}}(t) = -g_d \underline{d}(t) + \mu_d \tilde{\varepsilon}(t)\underline{u}(t-\tau),$$

Where $g_c$=$2\lambda_d$ and $g_d$=$2\lambda_d$ is the "forgetting" rates with respect to $\{\underline{c}_k\}_{k=1}^{K+1}$ and $\underline{d}$, $\mu_c$ and $\mu_d$ are the learning rates with respect to $\{\underline{c}_k\}_{k=1}^{K+1}$ and $\underline{d}$, and $\varepsilon(t) \doteq u_0(t) - \tilde{y}(t-\tau)$ is the error signal.

The ODEs for the dynamic reservoir 500 and the weight adaptation module 138 can be implemented directly in analog hardware. To implement the above ODEs in software or efficient digital hardware (e.g., field-programmable gate arrays (FPGAs) or custom digital application-specific integrated circuits (ASICs)), the update equations must be discretized.

For implementation in software or digital hardware, the ODEs are converted to delay difference equations (DDEs). For a linear dynamical system with the state-space representation:

$$\dot{\underline{x}}(t) = \underline{\underline{A}\underline{x}}(t) + \underline{B}u(t)$$

$$y(t) = \underline{C}(t)^T \underline{x}(t) + D(t)u(t),$$

Given the discrete time-step size, $\tau$, the equivalent DDE that describes the exact same filter dynamics is:

$$\underline{x}(t) = e^{\underline{A}\tau}\underline{x}(t-\tau) + \int_{t-\tau}^{t} e^{\underline{A}(t-s)} u(s)ds \cdot \underline{B}$$

$$y(t) = \underline{C}(t)^T \underline{x}(t) + D(t)u(t),$$

This shows that the current reservoir state $\underline{x}(t)$ is a function of the reservoir state at the previous time step $\underline{x}(t-\tau)$ and the input signal $u(t)$ over the interval $[t-\tau,t]$. Since the entire continuous interval is not available in software or digital hardware, in the digital cognitive radar processor, $u(t)$ is approximated over the interval using linear basis functions.

Figure 6A:
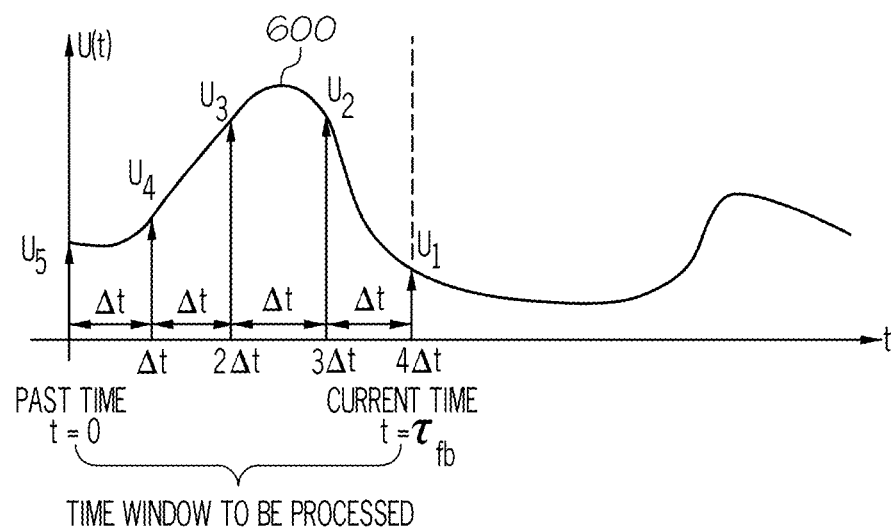
FIG. 6A is an example of approximation of an input signal u(t) using uniform sampling with with sampling period $\Delta t$ in accordance with an embodiment of the present disclosure.
Figure 6B:
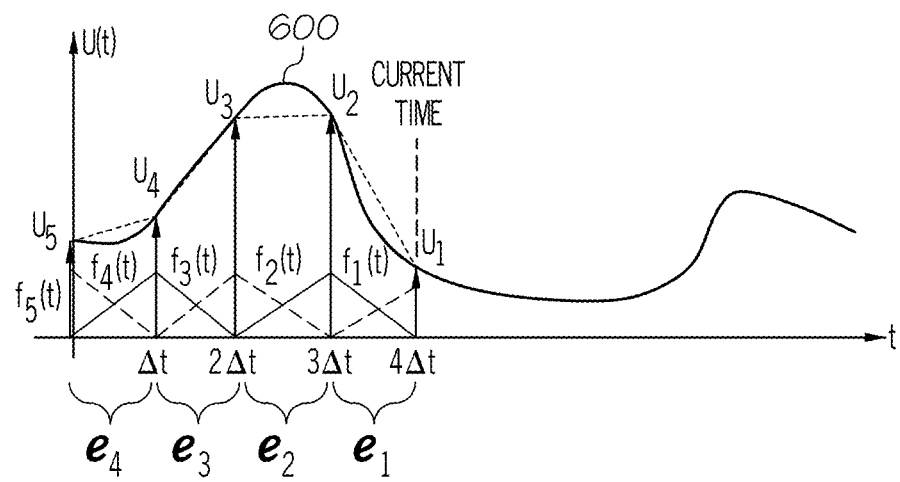
FIG. 6B is an example of using a linear basis function for approximation of the input signal u(t) in accordance with an embodiment of the present disclosure.

Referring also to FIGS. 6A and 6B, FIG. 6A is an example of approximation of an input signal $u(t)$ 600 using uniform sampling with sampling period $\Delta t$ in accordance with an embodiment of the present disclosure. FIG. 6B is an example of using a linear basis function for approximation of the input signal $u(t)$ 600 in accordance with another embodiment of the present disclosure. In these examples, input signal $u(t)$ 600 corresponds to input signal 124. Given the sampling period $\Delta t$, $u(t)$, a set of samples as follows:

$$u_i \doteq u(t-(i-1)\Delta t), 1 \leq i \leq n_e+1, \text{are collected}$$

Where $$n_e = \frac{\tau}{\Delta t}$$

is the number of sampling intervals within the time window defined by $\tau$ (see FIG. 6A). As shown in FIG. 6B, the input signal is approximated from the samples as $$u(t) \approx \sum_{i=1}^{n_e+1} u_i N_i(t),$$

Where $N_i(t)$=$T(t-(i-t)\Delta t)$ is a shifted version of the triangle function, $T(t)$:

$$T(t) = \begin{cases} 1 - t/\Delta t & 0 \leq t \leq \Delta t \\ 1 + t/\Delta t & -\Delta t \leq t \leq 0 \\ 0 & \text{otherwise} \end{cases}$$

Based on the linear basis approximation the DDE for the reservoir state $\underline{x}(t)$ becomes $$\underline{x}(t) = e^{\underline{A}\tau}\underline{x}(t-\tau) + \sum_{i=1}^{n_e+1}\left\{u_i\int_{t-\tau}^{t}e^{\underline{A}(t-s)}N_i(s)ds\cdot\underline{B}\right\}$$

Without loss of generality, set $t=\tau$ and two auxiliary matrices $\underline{B}_{1e}{}^i$ and $\underline{B}_{2e}{}^i$ are defined:

$$\underline{B}_{1e}^i \stackrel{def}{=} e^{\underline{A}(i-1)\Delta t}\int_0^{\tau}e^{\underline{A}(\tau-s)}N_1(s)ds\cdot\underline{B} = \frac{e^{\underline{A}(i-1)\Delta t}}{\Delta t}\underline{A}^{-2}(e^{\underline{A}\Delta t}-\Delta t\underline{A}-I)B$$

$$\underline{B}_{2e}^i \stackrel{def}{=} e^{\underline{A}(i-1)\Delta t}\int_0^{\tau}e^{\underline{A}(\tau-s)}N_2(s)ds\cdot\underline{B} =$$

$$e^{\underline{A}(i-1)\Delta t}\left\{\underline{A}^{-1}(e^{\underline{A}\Delta t}-I)-\frac{1}{\Delta t}\underline{A}^{-2}(e^{\underline{A}\Delta t}-\Delta t\underline{A}-I)\right\}B,$$

Then $\underline{x}(\tau))$ can be computed as:

$$\underline{x}(t) =$$

$$x(n_e\Delta t) = \underbrace{e^{\underline{A}\tau}}_{\tilde{A}}x(0) + \underbrace{[B_{1e}^1, (B_{2e}^1+B_{1e}^2), \ldots, (B_{2e}^{n_e-1}+B_{1e}^{n_e}), B_{2e}^{n_e}]}_{\tilde{B}}\begin{bmatrix}u_1\\u_2\\\vdots\\u_{n_e}\\u_{n_e+1}\end{bmatrix}$$

Based on this, iterative updates are derived for the state ($\underline{x}$), output (y), and weights, ($\{\underline{c}_k\}_{k=1}^{K+1}$, $\underline{d}$), which are in Algorithm 1 described below. Each required update step is achieved within one clock cycle without the need of waiting for a calculation step to be completed before a subsequent step can start. This enables a parallelized implementation of the de-noising algorithm.

Figure 7:
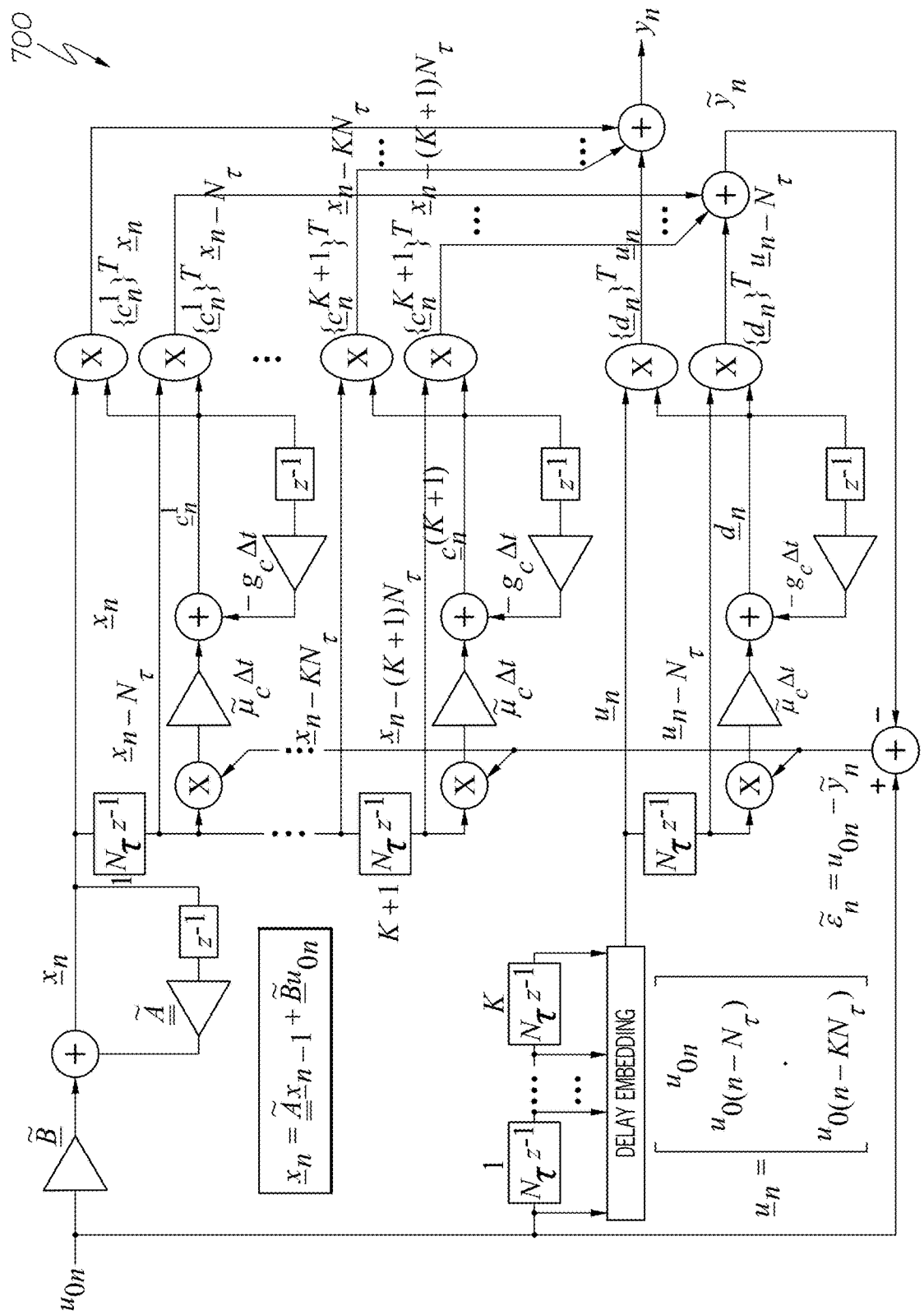
FIG. 7 is a schematic diagram of an example a cognitive radar processor in accordance with an embodiment of the present disclosure.

Referring to FIG. 7, FIG. 7 is a schematic diagram of an example a cognitive radar processor 700 in accordance with an embodiment of the present disclosure. The cognitive radar processor 700 shown in FIG. 7 is amenable to implementation on an FPGA or custom digital ASIC.

Algorithm 1 is a cognitive signal de-noising iterative algorithm and includes the following operations:
Initialization:

$$\underline{x}[k]=\underline{0}, \underline{c}_k[K+1]=\underline{0}\, k=1,2,\ldots,(K+1)$$

Iteration (starting at n=K+2):

$$\underline{x}[n] = \underline{\tilde{A}}\underline{x}[n-1] + \underline{\tilde{B}}\begin{bmatrix}u[n]\\u[n-1]\\\vdots\\u[n-n_e]\\u[n-(n_e+1)]\end{bmatrix}$$

$$\tilde{\varepsilon}[n] = u[n-1] - y[n-1]$$

$$\underline{c}_k[n] = (1-\Delta t g_c)\underline{c}_k[n-1] + \Delta t\tilde{\mu}_c\tilde{\varepsilon}[n]\underline{x}[n-1-k]$$

$$k = 1, 2, \ldots, (K+1)$$

$$y[n] = \sum_{k=1}^{K+1}\underline{c}_k[n]^T\underline{x}[n-k]$$

In accordance with an embodiment, the discretized state-space representation 142 for the time-varying reservoir 128 is derived by assuming that $\Delta t=\tau$, and consequently, $n_e=1$. Recalling from Algorithm 1 that the discretized state update equations for the dynamic reservoir with delay-embedded states is given by $$\underline{x}[n] = \underline{\tilde{A}}\underline{x}[n-1] + \underline{\tilde{B}}\begin{bmatrix}u[n]\\u[n-1]\end{bmatrix}$$

$$y[n] = \sum_{k=1}^{K+1}\underline{c}_k[n]^T\underline{x}[n-(k-1)] + d[n]u[n].$$

Grouping together the current state vector with the past K delayed state vectors $$\hat{\underline{x}}[n] \stackrel{def}{=} [\underline{x}[n], \underline{x}[n-1], \ldots, \underline{x}[n-K]]^T,$$

The phase delay embedding can be incorporated into the state-space representation of the dynamic reservoir:

$$\begin{bmatrix}\underline{x}[n]\\\underline{x}[n-1]\\\underline{x}[n-2]\\\vdots\\\underline{x}[n-K]\end{bmatrix} = \underbrace{\begin{bmatrix}\tilde{A} & 0 & 0 & \ldots & 0\\I & 0 & 0 & \ldots & 0\\0 & I & 0 & \ldots & 0\\\vdots & \ddots & \ddots & \ddots & \vdots\\0 & 0 & 0 & I & 0\end{bmatrix}}_{\underline{\hat{A}}}\begin{bmatrix}\underline{x}[n-1]\\\underline{x}[n-2]\\\underline{x}[n-3]\\\vdots\\\underline{x}[n-(K+1)]\end{bmatrix} + \underbrace{\begin{bmatrix}\tilde{B}\\0\\0\\\vdots\\0\end{bmatrix}}_{\underline{\hat{B}}}\begin{bmatrix}u[n]\\u[n-1]\end{bmatrix}$$

$$\hat{\underline{x}}[n] = \underline{\hat{A}}\hat{\underline{x}}[n-1] + \underline{\hat{B}}\begin{bmatrix}u[n]\\u[n-1]\end{bmatrix}$$

$$y[n] = \hat{\underline{c}}[n]^T\hat{\underline{x}}[n] + d[n]u[n]$$

This shows that a linear reservoir with N nodes combined with the phase delay embedding of size K is a linear reservoir with (K+1)N nodes where the state transition matrix $\underline{\hat{A}}$ and input-to-reservoir map $\underline{\hat{B}}$ have the above structured forms. The identity matrices are a computationally efficient mechanism for applying a static reservoir state transition matrix $\underline{\hat{A}}$ to the history 151 of the reservoir states 140a-140b. The time-varying reservoir 128 is obtained by applying a different state transition matrix $A_i$ for each delayed state $\underline{x}[n-i]$:

$$\begin{bmatrix}\underline{x}[n]\\\underline{x}[n-1]\\\vdots\\\underline{x}[n-K]\end{bmatrix} = \begin{bmatrix}A_0 & 0 & \ldots & 0\\0 & A_1 & \ldots & 0\\\vdots & \vdots & \ddots & \vdots\\0 & 0 & \ldots & A_K\end{bmatrix}\begin{bmatrix}\underline{x}[n-1]\\\underline{x}[n-2]\\\vdots\\\underline{x}[n-(K+1)]\end{bmatrix} +$$

$$\begin{bmatrix}\tilde{B}_1 & \tilde{B}_2 & 0 & \ldots & 0 & 0\\0 & \tilde{B}_1 & \tilde{B}_2 & \ldots & 0 & 0\\\vdots & \vdots & \vdots & \ddots & \ddots & \vdots\\0 & 0 & 0 & \ldots & \tilde{B}_1 & \tilde{B}_2\end{bmatrix}\begin{bmatrix}u[n]\\u[n-1]\\\vdots\\u[n-(K+1)]\end{bmatrix},$$

Where $\underline{\tilde{B}}_1$ and $\underline{\tilde{B}}_2$ are first and second columns of the discretized input-to-reservoir map $\tilde{B}$. Since a different state transition matrix $A_i$ is applied to each delayed state $\underline{x}[n-(i+1)]$, this time-varying reservoir 128 can be used to detect and de-noise non-stationary signals.

As an example, of how to design the time-varying reservoir 128 for optimally de-noising linear chirp signals, the state transition matrix $A_0$ is constructed for the first sub-reservoir to have N=2p poles distributed uniformly in some band of interest (e.g, between 10 MHz and 500 MHz) according to a Chebyshev low-pass filter prototype. The sub-reservoir specified by $A_0$ will have resonances at frequencies, $f_1 \ldots f_p$. Matrices $A_1 \ldots A_K$ then have rows that are cyclically shifted versions of the rows of $A_0$. The jth row of the state transition matrix of $A_i$ is given by:

$$A_{i(j)} = \begin{cases} A_{0(j+2i)} & 1 \le j \le 2p - 2i \\ A_{0(j+2i-2p)} & i = 2p - i < j \le 2p \end{cases}.$$

The sub-reservoirs specified by $A_1 \ldots A_K$ all have the same resonant frequencies as $A_0$, but are applied to different elements of the state vector. Thus, for a linear chirp signal $$u(t) = \sin\left(\phi_0 + 2\pi\left(f_1 + \frac{f_p - f_1}{T}t\right)\right)$$

with sweep rate, T, the same state of the time-varying reservoir 128 will detect and track this signal as it sweeps from frequency $f_1$ to frequency $f_p$. Note that for the chirp-optimized reservoir, because each $A_i$ is a permuted version of $A_0$, the computation of the reservoir state update is not significantly increased compared to the static reservoir.

The real-time de-noised time-varying spectrogram 168 is provided using the de-noised reservoir states 170a-170n as previously described. Because the de-noised reservoir states 170a-170n are for a time-varying reservoir 128, they can be interpreted as the response to a bank of time-varying filters 172. Thus, for the chirp-optimized reservoir described above, the set of de-noised reservoir states 170a-170n form a chirplet spectrogram or real-time de-noised time-varying spectrogram 168. This chirplet spectrogram or real-time de-noised time-varying spectrogram 168 can be used for a variety of real-time signal analysis tasks, such as detection, separation of signals, and tracking of individual radar pulses within an input wideband signal mixture.

Mapping the reservoir computer 126 output directly to range measurements 130 via the chirplet transform module 164 allows the cognitive radar processor 132 alone to function as the de-chirp, and detection functional blocks in state-of-the-art chirped radar implementations. As previously described, the de-noised reservoir states 170a-170n are interpreted as a bank of time-varying filters 172 at the chirp rate 106 set by the transmit chirp pulse 104. The response of the time-varying filters 172 to chirps received at different times are equivalent to the response of a bank of narrowband 1-pole IIR filters to different frequencies. This is precisely the function of the de-chirp functional block in traditional radar receivers. Therefore the different responses of the de-noised reservoir states 170a-170n represent different range measurements 130a-130n to targets 118a-118n reflecting the transmitted chirp pulses 104.

The de-noised reservoir states 170a-170n represent relative range measurements $r_i$ inside the radar return receive window or time duration the receiver in on and able to receiving signals. The absolute range measurement can be computed from the delay between the transmit time $T_{Tx}$ and the receive time $T_{Rx}$:

$$R_0 = (T_{Rx} - T_{Tx})/2c$$

$$R_i = r_i + R_0$$

The signal's signal-to-noise ratio (SNR) can be further increased through (effective) "pulse compression" by integrating (summing) the output of a single reservoir state (a single filter in the bank of time-varying filters 172) using integration module 166 as previously described. Note that this demonstrates that the SNR increase due to the reservoir computer de-noising is in addition to the effective gain increase obtained by pulse compression in traditional radar applications.

Figure 8:
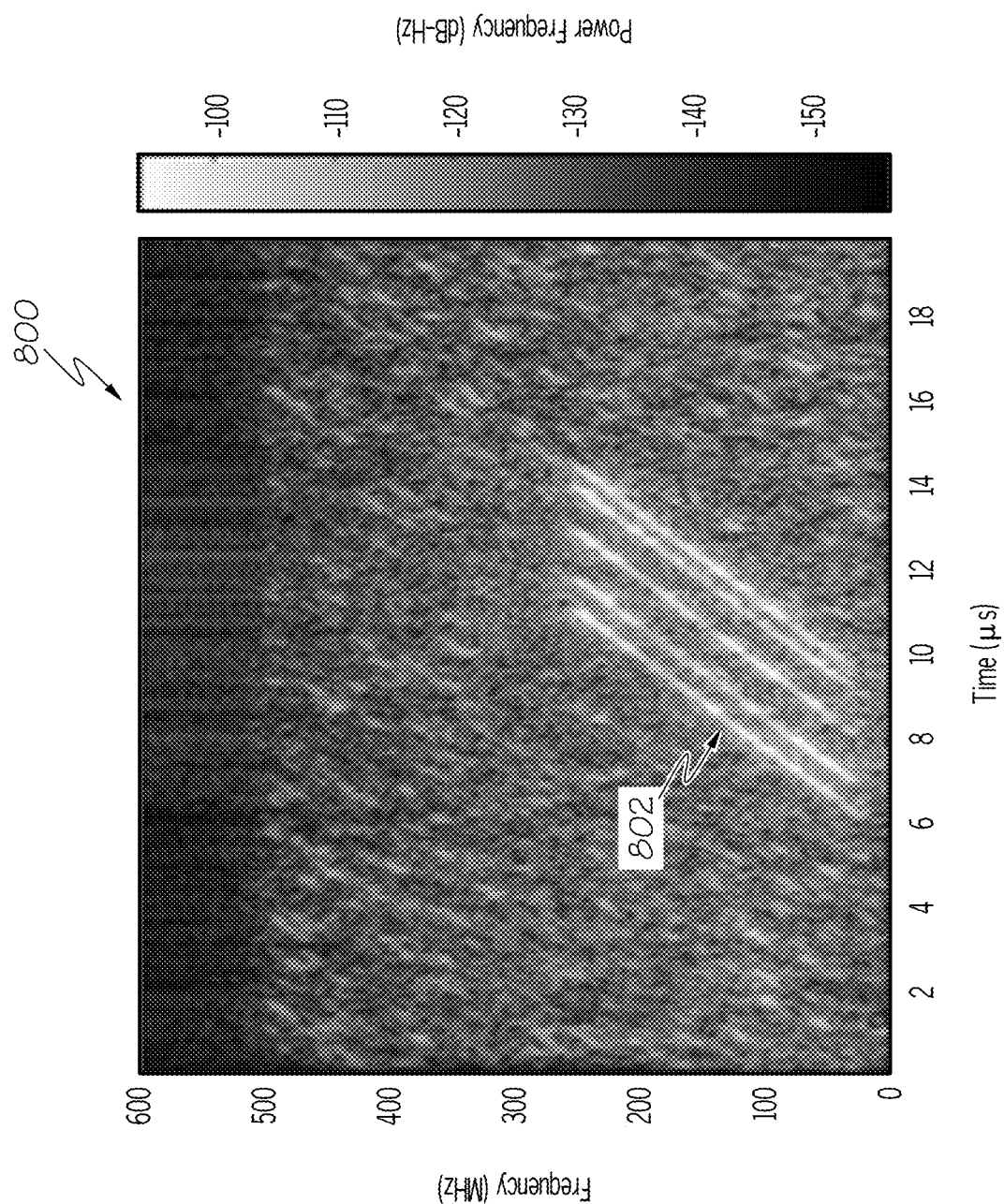
FIG. 8 is an example of a spectrogram of a de-noised signal in accordance with an embodiment of the present disclosure.

Referring to FIG. 8, FIG. 8 is an example of a chirplet spectrogram 800 of a de-noised input signal in accordance with an embodiment of the present disclosure. FIG. 8 shows the chirplet transform read off from the de-noised reservoir states 170a-170n. The horizontal lines in a chirplet spectrogram or diagonal lines in a standard spectrogram 802 correspond to (simulated) received radar returns at the transmit chirp rate 106 of $31.831 \times 10^{-6}$ $fs^2$ where fs is the sample rate of the ADC. The y-axis represents the relative range measurements $r_i$ inside the radar return receive window. The absolute range measurement can be computed from the delay between the transmit time $T_{Tx}$ and the receive time $T_{Rx}$ using the equations for $R_0$ and $R_i$ above. As previously described, the signal's SNR can be further increased through (effective) pulse compression (integration along the x-axis). Note that this demonstrates that the SNR increase due to the reservoir computer de-noising is in addition to the effective gain increase obtained by pulse compression.

Figure 9:
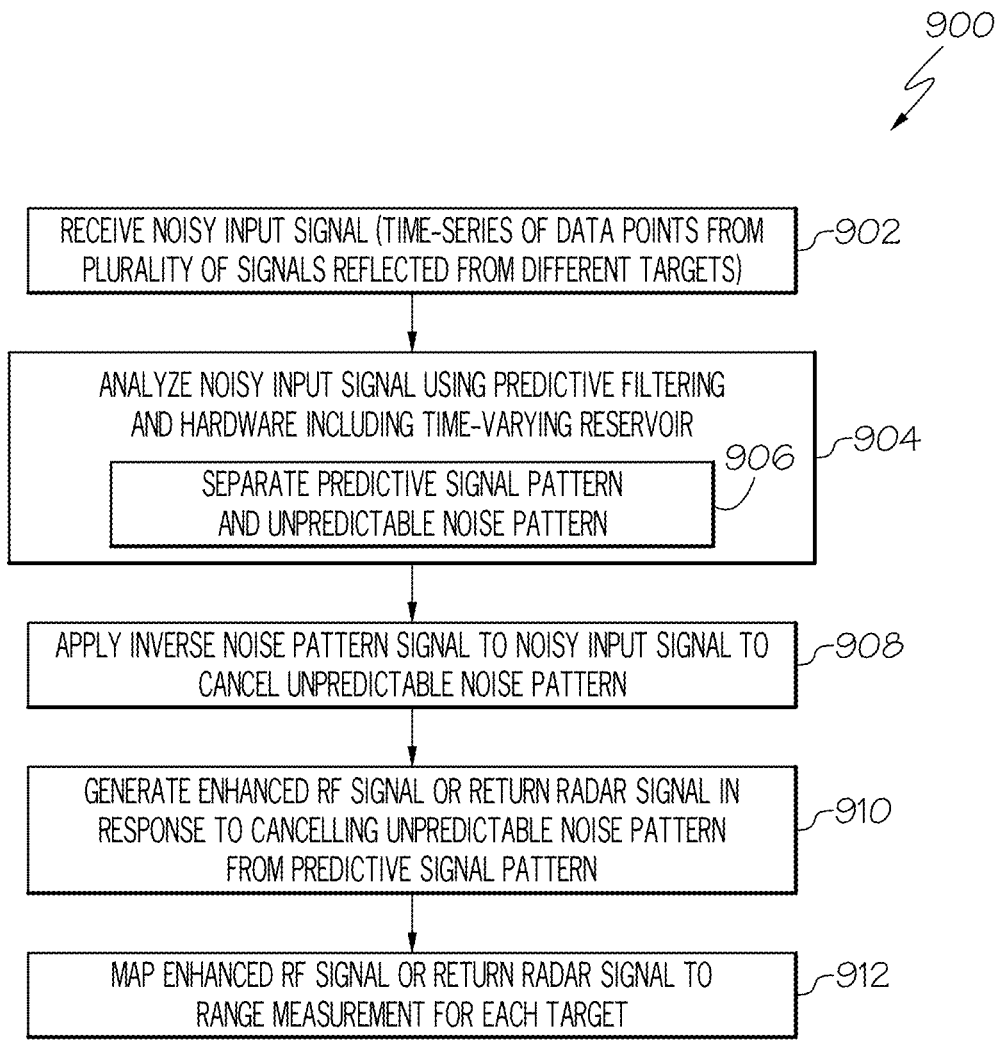
FIG. 9 is a flow chart of an example of a method for measuring a range to each of a plurality of targets using a below-noise after transmit (BAT) Chirp Radar in accordance with an embodiment of the present disclosure.

FIG. 9 is a flow chart of an example of a method 900 for measuring a range to each of a plurality of targets using a below-noise after transmit (BAT) Chirp Radar in accordance with an embodiment of the present disclosure. In accordance with an example, the method 900 is embodied in and performed by the reservoir computer 126 or cognitive radar processor 132 in FIG. 1. Accordingly, the reservoir computer 126 or cognitive radar processor 132 is configured to perform a set functions defined by the method 900.

In block 902, a noisy input signal is received by a cognitive radar processor. The noisy input signal includes a plurality of reflected RF signals or radar signals from a plurality of targets and noise.

In block 904, predictive filtering including a time-varying reservoir is used to analyze the noisy input signal. In block 906, the noisy input signal is analyzed to separate a predictive signal pattern and an unpredictable noise pattern for identifying the unpredictable noise pattern.

In block 908, an inverse noise signal is applied to the noisy input signal to cancel the unpredictable noise pattern. The inverse noise signal corresponds to the unpredictable noise pattern.

In block 910, an enhanced RF signal or return radar signal is generated in response to cancelling the unpredictable noise pattern from the predictive signal pattern.

In block 912, the enhanced RF signal or return radar signal is mapped to range measurements for each of the targets.

Figure 10:
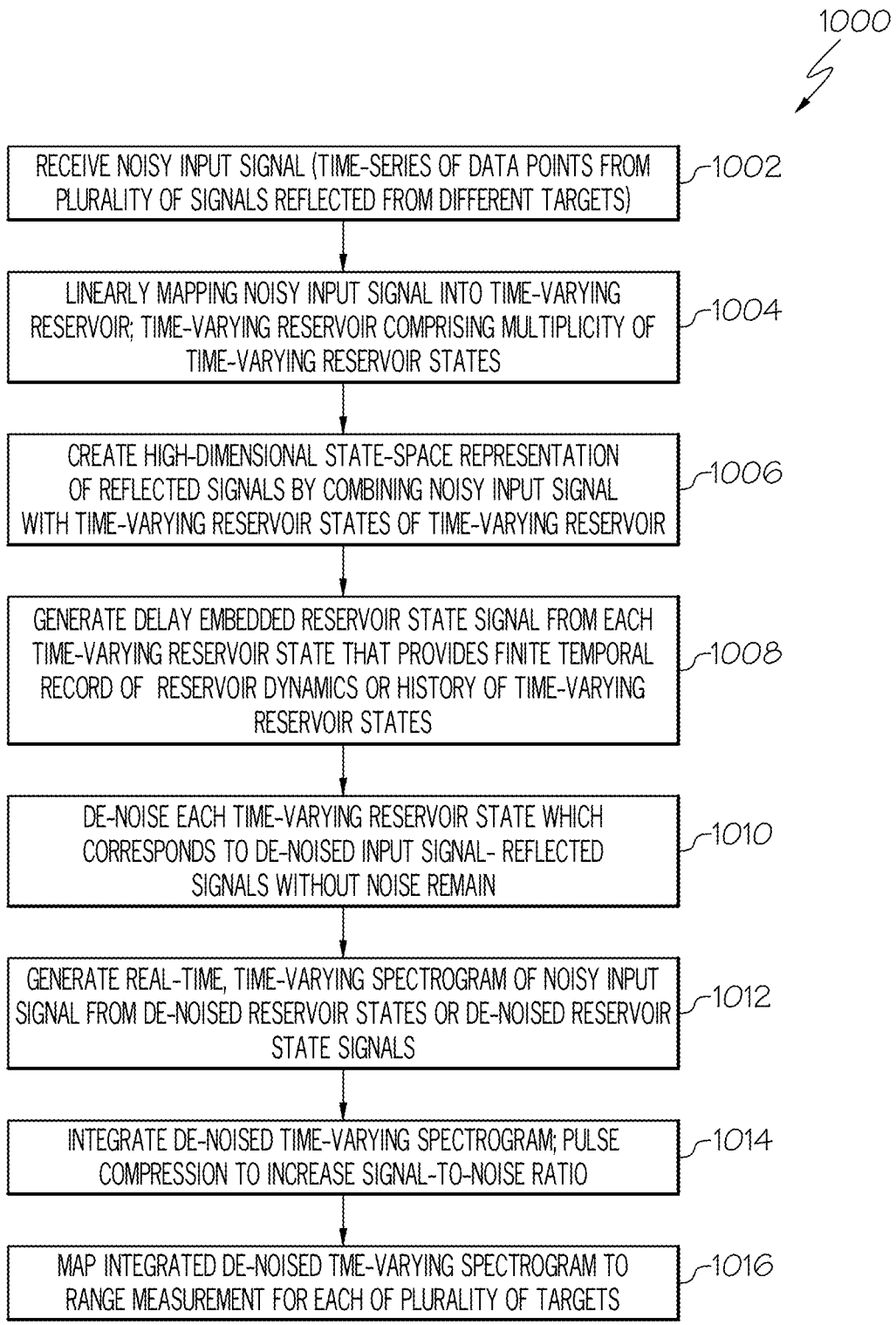
FIG. 10 is a flow chart of an example of a method for measuring a range to each of a plurality of targets using a BAT Chirp Radar in accordance with another embodiment of the present invention.

FIG. 10 is a flow chart of an example of a method 1000 for measuring a range to each of a plurality of targets using a below-noise after transmit (BAT) Chirp Radar in accordance with another embodiment of the present disclosure. In accordance with an example, the method 1000 is embodied in and performed by the reservoir computer 126 or cognitive radar processor 132 in FIG. 1. Accordingly, the reservoir computer 126 or cognitive radar processor 132 is configured to perform a set functions defined by the method 1000.

In block 1002, a noisy input signal is received. In accordance with the exemplary embodiment in FIG. 1, the noisy input signal 124 is a time-series of data points from a plurality of reflected signals 116a-116n sampled from a bandwidth greater than about 30 GHz. Although other bandwidths may also be sampled.

In block 1004, the noisy input signal is linearly mapped into a time-varying reservoir. The time-varying reservoir includes a multiplicity of time-varying reservoir states. In block 1006, a high-dimensional state-space representation or multi-dimensional state-space representation of the reflected signals is created by combining the noisy input signal with the time-varying reservoir states of the time-varying reservoir.

In block 1008, a delay embedded reservoir state signal is generated from each time-varying reservoir state that provides a finite temporal record of the reservoir state dynamics or history of the time-varying reservoir states.

In block 1010, each time-varying reservoir state is de-noised which corresponds to de-noising the noisy input signal so that noise is removed and signals corresponding to the reflected signals without noise remain. In block 1012, a real-time de-noised time-varying spectrogram of the noisy input signal is generated from the de-noised reservoir states or de-noised reservoir state signals.

In block 1014, the de-noised time-varying spectrogram is integrated in an output layer of the cognitive radar processor. In block 1016, the integrated de-noised time-varying spectrogram is mapped to the range measurement for each of the plurality of targets.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A radar system, comprising:
   a transmit antenna for transmitting a radio frequency (RF) signal or a radar signal;
   a receive antenna for receiving a plurality of reflected signals created by a plurality of targets reflecting the RF signal or radar signal, the reflected signals comprising noise;
   an analog-to-digital converter (ADC) that digitizes or samples the reflected signals to provide a digitized or sampled noisy input signal; and
   a reservoir computer that receives the noisy input signal, the reservoir computer comprising a time-varying reservoir and being configured to de-noise the noisy input signal and provide a range measurement for each of the plurality of targets, wherein the time-varying reservoir comprises a state transition matrix comprising a predetermined block diagonal structure that is optimized for signal de-noising.

2. The radar system of claim 1, wherein the RF signal or radar signal comprises a chirped or step-chirped waveform.

3. The radar system of claim 1, wherein the reservoir computer comprises a cognitive radar processor, and the cognitive radar processor comprising the time-varying reservoir, the time-varying reservoir comprising a multiplicity of time-varying reservoir states and the time-varying reservoir being configured to linearly map the noisy input signal into respective reservoir states.

4. The radar system of claim 3, wherein the cognitive radar processor further comprises:
   a delay embedding module, the delay embedding module being configured to receive a reservoir state signal corresponding to each respective time-varying reservoir state and to generate a delay embedded reservoir state signal corresponding to each time-varying reservoir state that represents a history of the time-varying reservoir states or reservoir state dynamics over a short-time period based on a predetermined time delay of the delay embedding module; and
   a weight adaptation module that receives the delay embedded reservoir state signals, the weight adaptation module being configured to produce a de-noised reservoir state signal for each time-varying reservoir state or reservoir state signal, the de-noised reservoir state signals correspond to the noisy input signal being de-noised to provide a de-noised input signal.

5. The radar system of claim 4, wherein the weight adaptation module is configured to produce a prediction of the noisy input signal at a predetermined future time from the delay embedded reservoir state signals and to use the prediction of the noisy input signal to de-noise each reservoir state signal using a gradient descent learning algorithm, wherein weights of the weight adaptation module are determined using the gradient descent learning algorithm.

6. The radar system of claim 5, wherein the cognitive radar processor further comprises a chirplet transform module that receives de-noised reservoir states or the de-noised reservoir state signals, corresponding to the de-noised input signal, from the weight adaptation module and generates a real-time de-noised spectrogram of the de-noised input signal representing the reflected signals from the plurality of targets, wherein the chirplet transform module is configured to map each of the de-noised reservoir states or de-noised reservoir state signals to the range measurement of each of the plurality of targets.

7. The radar system of claim 6, wherein the de-noised reservoir states define a bank of time-varying filters at a chirp rate set by a transmit chirp of the RF signal or the radar signal, wherein a response of the time-varying filters to chirps received at different times are equivalent to a response of a bank of 1-pole infinite impulse response (IIR) filters to different frequencies.

8. The radar system of claim 6, further comprising an integration module for integrating the real-time de-noised spectrogram of the de-noised input signal to create an integrated de-noised spectrogram and mapping the integrated de-noised spectrogram to the range measurements, wherein the integration module is configured to increase a signal-to-noise ratio of each de-noised reservoir state signal by pulse compression comprising integrating or summing an output of each de-noised reservoir state signal.

9. The radar system of claim 5, wherein the time-varying reservoir comprises a recurrent neural network comprising a plurality of nodes, each node corresponding to one of the time-varying reservoir states.

10. The radar system of claim 4, wherein the delay embedding module comprises a delay embedded reservoir state vector that has a different state transition matrix to enable time-varying dynamics.

11. The radar system of claim 1, wherein the reservoir computer comprises a cognitive radar processor, wherein the cognitive radar processor is configured to perform a set of functions comprising:
  receiving the noisy input signal, the noisy input signal being a time-series of data points from the reflected signals sampled from a bandwidth greater than about 30 GHz;
  linearly mapping the noisy input signal into the time-varying reservoir, the time-varying reservoir comprising a multiplicity of time-varying reservoir states;
  creating a state-space representation of the reflected signals by combining the noisy input signal with the time-varying reservoir states of the time-varying reservoir;
  generating a delay embedded reservoir state signal from each time-varying reservoir state that provides a finite temporal record of reservoir state dynamics or history of the time-varying reservoir states;
  de-noising each time-varying reservoir state which corresponds to de-noising the noisy input signal so that noise is removed and signals corresponding to the reflected signals without noise remain;
  generating a real-time de-noised time-varying spectrogram of the noisy input signal from the de-noised reservoir states or de-noised reservoir state signals;
  integrating the de-noised time-varying spectrogram in an output layer of the cognitive radar processor; and
  mapping the integrated de-noised time-varying spectrogram to the range measurement for each of the plurality of targets.

12. A cognitive radar processor, comprising:
  a time-varying reservoir, the time-varying reservoir comprising a multiplicity of time-varying reservoir states and the time-varying reservoir being configured to linearly map a noisy input signal into respective reservoir states;
  a delay embedding module, the delay embedding module being configured to receive a reservoir state signal corresponding to each respective time-varying reservoir state and to generate a delay embedded reservoir state signal corresponding to each time-varying reservoir state that represents a history of the time-varying reservoir states or reservoir state dynamics over a time period based on a predetermined time delay of the delay embedding module; and
  a weight adaptation module that receives the delay embedded reservoir state signals, the weight adaptation module being configured to produce a de-noised reservoir state signal for each reservoir state or reservoir state signal, the de-noised reservoir state signals correspond to the noisy input signal being de-noised to provide a de-noised input signal.

13. The cognitive radar processor of claim 12, wherein the weight adaptation module is configured to produce a prediction of the noisy input signal at a predetermined future time from the delay embedded reservoir state signals and to use the prediction of the noisy input signal to de-noise each reservoir state signal using a gradient descent learning algorithm, wherein weights of the weight adaptation module are determined using the gradient descent learning algorithm.

14. The cognitive radar processor of claim 13, wherein the cognitive radar processor further comprises a chirplet transform module that receives de-noised reservoir states or the de-noised reservoir state signals, corresponding to the de-noised input signal, from the weight adaptation module and generates a real-time de-noised spectrogram of the de-noised input signal representing reflected signals from a plurality of targets, wherein the chirplet transform module is configured to map each of the de-noised reservoir states or de-noised reservoir state signals to a range measurement of each of the plurality of targets.

15. The cognitive radar processor of claim 14, further comprising an integration module for integrating the real-time de-noised spectrogram of the de-noised input signal to create an integrated de-noised spectrogram and mapping the integrated de-noised spectrogram to the range measurements, wherein the integration module is configured to increase a signal-to-noise ratio of each de-noised reservoir state signal by pulse compression comprising integrating or summing an output of each de-noised reservoir state signal.

16. The cognitive radar processor of claim 12, being configured to perform a set of functions comprising:
  receiving the noisy input signal, the noisy input signal being a time-series of data points sampled from a plurality of reflected signals sampled from a bandwidth greater than about 30 GHz;
  linearly mapping the noisy input signal into the time-varying reservoir, the time-varying reservoir comprising a multiplicity of time-varying reservoir states;
  creating a state-space representation of the reflected signals by combining the noisy input signal with the time-varying reservoir states of the time-varying reservoir;
  generating a delay embedded reservoir state signal from each time-varying reservoir state that provides a finite temporal record of the reservoir state dynamics or history of the time-varying reservoir states;

de-noising each time-varying reservoir state which corresponds to de-noising the noisy input signal so that noise is removed and signals corresponding to the reflected signals without noise remain;

generating a real-time de-noised time-varying spectrogram of the noisy input signal from the de-noised reservoir states or de-noised reservoir state signals;

integrating the de-noised time-varying spectrogram in an output layer of the cognitive radar processor; and mapping the integrated de-noised time-varying spectrogram to a range measurement for each of a plurality of targets.

17. A method for measuring range to each of a plurality of targets, comprising:

receiving a noisy input signal by a cognitive radar processor, the noisy input signal comprising a plurality of reflected RF signals or radar signals from a plurality of targets;

using predictive filtering including a time-varying reservoir to analyze the noisy input signal;

analyzing the noisy input signal to separate a predictive signal pattern and an unpredictable noise pattern;

applying an inverse noise signal to the noisy input signal to cancel the unpredictable noise pattern, the inverse noise signal corresponding to the unpredictable noise pattern;

generating an enhanced RF signal or return radar signal in response to cancelling the unpredictable noise pattern from the predictive signal pattern; and mapping the enhanced RF signal or return radar signal to range measurements for each of the plurality of targets.

18. The method of claim 17, further comprising:

linearly mapping the noisy input signal into the time-varying reservoir, the time-varying reservoir comprising a multiplicity of time-varying reservoir states;

creating a state-space representation of the reflected signals by combining the noisy input signal with the time-varying reservoir states of the time-varying reservoir;

generating a delay embedded reservoir state signal from each time-varying reservoir state that provides a finite temporal record of reservoir state dynamics or history of the time-varying reservoir states;

de-noising each time-varying reservoir state which corresponds to de-noising the noisy input signal so that noise is removed and signals corresponding to the reflected signals without noise remain;

generating a real-time de-noised time-varying spectrogram of the noisy input signal from the de-noised reservoir states or de-noised reservoir state signals;

integrating the de-noised time-varying spectrogram in an output layer of the cognitive radar processor; and mapping the integrated de-noised time-varying spectrogram to the range measurement for each of the plurality of targets.

19. A method for measuring range to each of a plurality of targets, comprising:

receiving a noisy input signal by a cognitive radar processor, the noisy input signal comprising a time-series of data points sampled from a plurality of reflected signals from the plurality of targets sampled from a bandwidth greater than about 30 GHz;

linearly mapping the noisy input signal into a time-varying reservoir, the time-varying reservoir comprising a multiplicity of time-varying reservoir states;

creating a state-space representation of the reflected signals by combining the noisy input signal with the time-varying reservoir states of the time-varying reservoir;

generating a delay embedded reservoir state signal from each time-varying reservoir state that provides a finite temporal record of reservoir state dynamics or history of the time-varying reservoir states;

de-noising each time-varying reservoir state which corresponds to de-noising the noisy input signal so that noise is removed and signals corresponding to the reflected signals without noise remain;

generating a real-time de-noised time-varying spectrogram of the noisy input signal from the de-noised reservoir states or de-noised reservoir state signals;

integrating the de-noised time-varying spectrogram in an output layer of the cognitive radar processor; and mapping the integrated de-noised time-varying spectrogram to a range measurement for each of the plurality of targets.

20. The radar system of claim 1, wherein the state transition matrix comprises a 2×2 block diagonal form comprising a plurality of 2×2 blocks, each 2×2 block corresponds to a single pole infinite impulse response filter.

* * * * *